United States Patent

Ueda et al.

[11] Patent Number: 5,923,315
[45] Date of Patent: Jul. 13, 1999

[54] DISPLAY CHARACTERISTIC DETERMINING DEVICE

[75] Inventors: Masashi Ueda, Nagoya; Masaaki Hori, Tajimi; Yasunari Yoshida, Aichi-ken; Masaaki Hibino, Yokkaichi; Koji Kobayakawa, Ichinomiya; Kiyotaka Ohara, Nagoya, all of Japan

[73] Assignee: Brother Kogyo Kabushiki Kaisha, Nagoya, Japan

[21] Appl. No.: 08/855,114

[22] Filed: May 13, 1997

[30] Foreign Application Priority Data

May 14, 1996 [JP] Japan ..................... 8-118801

[51] Int. Cl.⁶ .................................. G09G 5/02
[52] U.S. Cl. ..................... 345/150; 348/180; 348/184
[58] Field of Search .................... 345/146, 150, 345/431, 154; 358/501, 515, 518, 519, 523; 348/184, 177, 180, 708

[56] References Cited

U.S. PATENT DOCUMENTS

| 4,959,711 | 9/1990 | Hung et al. | 358/523 |
| 5,298,993 | 3/1994 | Edgar et al. | 348/180 |
| 5,381,349 | 1/1995 | Winter et al. | 382/167 |
| 5,408,342 | 4/1995 | Kumada et al. | 358/518 |
| 5,499,040 | 3/1996 | McLaughlin et al. | 345/146 |
| 5,754,222 | 5/1998 | Daly et al. | 348/184 |

FOREIGN PATENT DOCUMENTS

| B2-59-41227 | 10/1984 | Japan . |
| A-63-162248 | 7/1988 | Japan . |
| A-6-35430 | 2/1994 | Japan . |

OTHER PUBLICATIONS

JIS Z8729 "Specification of Colour of Materials according to the CIE 1976 (L*a*b*) Space and the CIE 1976 (L*U*V*) Space," pp.150–159, 567 & vi–vii.

*Primary Examiner*—Richard J. Hjerpe
*Assistant Examiner*—Francis N. Nguyen
*Attorney, Agent, or Firm*—Oliff & Berridge, PLC

[57] ABSTRACT

The pattern to be displayed on the display is constructed from at least three tone levels to display specific shapes such as letters and numeric characters. The pattern is designed so that the user will visually perceive different shapes when displayed at different display characteristics. The display characteristic is determined according to the user's perceived shape.

32 Claims, 18 Drawing Sheets

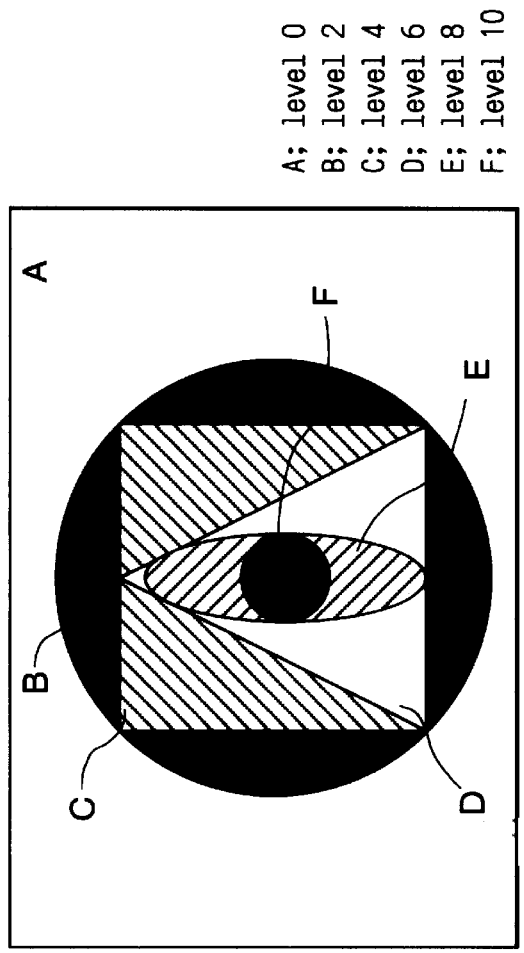
FIG. 14 (a)
A; level 0
B; level 2
C; level 4
D; level 6
E; level 8
F; level 10
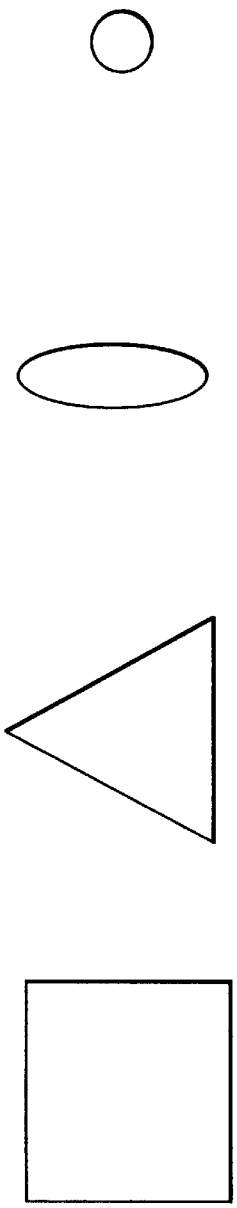
FIG. 14 (f)
FIG. 14 (e)
FIG. 14 (d)
FIG. 14 (c)
FIG. 14 (b)

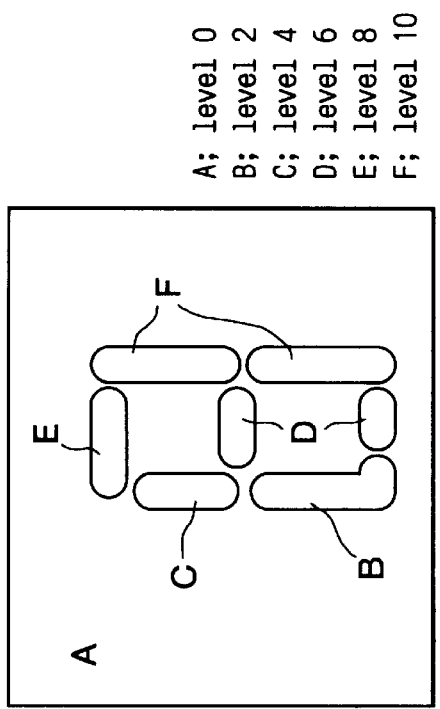
FIG. 16 (a)
A; level 0
B; level 2
C; level 4
D; level 6
E; level 8
F; level 10
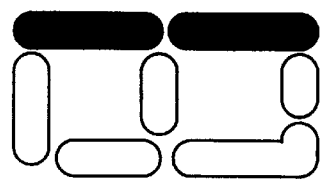
FIG. 16 (f)
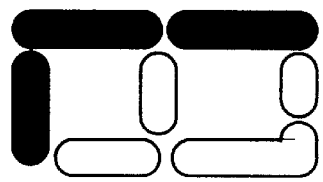
FIG. 16 (e)
FIG. 16 (d)
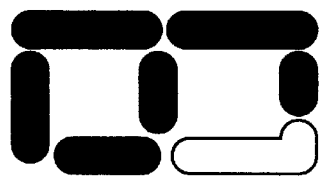
FIG. 16 (c)
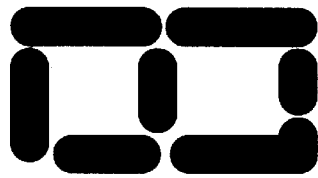
FIG. 16 (b)

A; level 0
B; level 2    G; level 12
C; level 4    H; level 14
D; level 6    I; level 16
E; level 8    J; level 18
F; level 10   K; level 20

A; PATTERN FORMED FROM
   ALTERNATELY ARRANGED
   LEVELS OF 0 AND 255

B; level 126    F; level 128
C; level 124    G; level 130
D; level 122    H; level 132
E; level 120    I; level 134

J; level 220

| SHAPE NAME | 08 | 28 | 68 | ....... | 98 | other |
|---|---|---|---|---|---|---|
| γ VALUE | 0.94 | 0.96 | 0.92 | | 0.98 | 1.80 |

DISPLAY CHARACTERISTIC DETERMINING DEVICE

BACKGROUND OF THE INVENTION

1. Field of the Invention

The present invention relates to a display characteristic determining device for determining display characteristic of a display device such as a CRT. More particularly, the present invention relates to a display characteristic determining device to be used in a system capable of performing a color matching between a display device and a printing device.

2. Description of Related Art

Color of light emitted from a CRT and color printed by a color printer are different from each other due to the differences between their employing coloring mechanism and their using primary colors. A color calibration device is therefore required to calibrate colors on the CRT so that the colors appear the same as those on the printer. It is noted, however, that each type of CRT device has its own display characteristic. The display characteristic of each CRT device changes in time. Accordingly, in order to achieve proper color calibration, it is necessary to correctly know the display characteristic of the CRT device.

There is a CRT device of a type provided with an adjustment dial for allowing a user to adjust, into his/her desired degrees, both brightness and contrast, i.e., difference between dark and light portions. The display characteristic therefore varies also according to the user's adjustment operation. Accordingly, it is also necessary to know the present display characteristic in order to perform the color calibration.

The display characteristic of the display device depends on a relationship between a tone signal value inputted to the display device to display each primary color (red, green, and blue) and brightness actually obtained on the CRT device. This relationship will be referred to as "tone reproduction" hereinafter.

The tone reproduction can be represented by the following equation (1):

$$V=\{(L-BK)/(255-BK)\}^\gamma \qquad (1)$$

where $V$ ($0 \leq V \leq 1$) is a value of brightness relative to a maximum brightness value which is normalized to one (1), $L$ ($0 \leq L \leq 255$) is a value of a tone signal inputted to the CRT device for each of the R, G, and B components, BK ($0 \leq BK \leq 255$) is a black point, and $\gamma$ ($\gamma > 0$) is a tone reproduction value. It is noted that $V=0 \ldots$ (2) where $L<BK$.

FIGS. 1–4 show tone reproductions of various types of CRT devices. FIG. 1 shows a tone reproduction of a 19 inch display produced by Mackintosh Corporation. In the graph, points+indicate actually-measured values, and a solid line indicates values obtained through calculating the formula (1) where BK=16 and $\gamma$=1.87. It is therefore apparent that the formula (1) can approximate the actual tone reproduction. FIGS. 2–4 show tone reproduction of a display of 2414 type produced by IBM Corporation when an attached adjustment dial is manipulated to change its tone reproduction. In FIG. 2, points+indicate values actually measured when the adjustment dial is manipulated to select a high contrast. In the graph, solid line indicates values obtained through calculating the formula (1) where BK=68 and $\gamma$=2.02. In FIG. 3, points+indicate values actually measured when the adjustment dial is manipulated to select a middle contrast. A solid line indicates values obtained through calculating the formula (1) where BK=32 and $\gamma$=1.54. In FIG. 4, points+ indicate values actually obtained when the dial is manipulated to select a low contrast. A solid line indicates values obtained through calculating the formula (1) where BK=0 and $\gamma$=1.38. It is apparent from the figure that even when the tone reproduction changes according to the display type and according to a user's adjustment, the tone reproduction can be approximated by the formula (1) with corresponding variables BK and $\gamma$. It is therefore apparent that those values BK and $\gamma$ determine the tone reproduction of the CRT.

Various methods have been proposed to determine the tone reproduction without using an expensive detecting device. For example, one method has been proposed in U.S. Pat. No. 5,298,993.

Based on the method disclosed in the patent, it is conceivable to determine the tone reproduction in a manner as described below.

The CRT device is controlled to display two display parts A1 and A2 shown in FIG. 5. In the display part A1, two tone portions, obtained by tone signals L1 and L2, are arranged alternately where $0 \leq L1, L2 \leq 255$ and L1<L2. It is assumed that the tone portion obtained by the tone signal L1 has brightness V1, and the tone portion obtained by the tone signal L2 has brightness V2. The other display part A2 is obtained only by tone signals L3 where L1<L3<L2.

It is further assumed that when tone signal values 0 and 255 are inputted to the CRT display device, the display device displays the most dark portion and the most light portion, respectively. Brightness V1 of the most dark portion is defined as zero (0), and brightness V2 of the most light portion is defined as one (1). That is, V1=0, V2=1. The tone reproduction is calculated through a procedure shown in FIG. 6.

First, in S101, the tone signal values L1 and L2 for the display part A1 are set to 0 and 255, respectively, and the CRT device is controlled with the tone signals L1 and L2 to display the display part A1. Because tone portions formed by the signals L1 and L2 are arranged alternately in the display part A, the display part A1 exhibits brightness of VA1 which is an average of the two brightness level V1 and V2. That is, $$VA1=(V1+V2)/2=0.5$$

Then, in S102, a user adjusts the value of the tone signal L3 to be inputted to the CRT display device so that the brightness VA2 of the display part A2 will be perceived by the user as equal to the brightness VA1 of the display part A1. When the brightness of the display part A2 appears the same as that of the display part A1, the brightness values VA1 and VA2 satisfy the following equation:

$$VA2=VA1=0.5.$$

Then, in S103, the user sets the value VA1 as a brightness value obtained by the present tone signal value L3.

When it is assumed that BK=0, the formula (1) can be represented by the following formula (3):

$$V=(L/255)^\gamma \qquad (3)$$

This formula (3) can be also represented by the following formula (4):

$$\gamma=\log(V)/\log(L/255) \qquad (4)$$

Accordingly, in S104, the values VA1 and L3 are substituted for the values V and L in the formula (4), and the following formula (5) is calculated:

$$\gamma = \log(VA1)/\log(L3/255) \qquad (5)$$

Thus, the gamma value, which is one of the main variables representing the tone reproduction, can be determined through the user's visual examination of the display state of FIG. 5. The one main variable γ can therefore be determined without using any auxiliary devices. The user can easily judge whether the display parts A1 and A2 have the same brightness.

Another U.S. Pat. No. 5,381,349 has proposed a method for determining another variable, i.e., black point BK, for representing the tone reproduction.

Based on the method of the patent, it is conceivable to determine a black point as described below with reference to FIG. 7.

First, in S110, the CRT display is controlled to display a test pattern shown in FIG. 8. The test pattern includes two identical parts A formed by tone signals of zero (0) and a part B formed by a variable tone signal LB. Then, the value of the tone signal LB is set to one (1) in S111, and the test pattern is again displayed in S112. In S113, the user judges whether or not he/she perceives any difference in brightness between the parts A and B. When the user perceives no difference in brightness between the parts A and B (No in S113), the value of the tone signal LB is incremented by one (1) in S115, and the process of S112 is again performed. When the user perceives some difference in brightness between the parts A and B ("Yes" in S113), a black point BK is set as a value obtained by subtracting a value of one (1) from the present tone signal value LB in S114. That is, BK=LB−1.

The above-described process provides a simple method capable of easily determining a black point range BK that can provide the same brightness as that of the most dark portion (black portion).

Thus, the two variables BK and γ, representing the tone reproduction, can be obtained easily.

In the above-described conceivable methods, however, the user has to perform various adjustment operations while visually observing the display state. The user has to perform the adjustment operations while judging whether two displayed portions exhibit the same brightness and while judging whether there appears any difference in brightness between two displayed portions. Thus, the user has to adjust brightness of the adjustment tone region (A2 of FIG. 5 and B of FIG. 8) while visually comparing the brightness of the adjustment tone region with the brightness of the reference tone region (A1 of FIG. 5 and A of FIG. 8). These adjustment operations are still troublesome.

SUMMARY OF THE INVENTION

It is therefore an object of the present invention to overcome the above-described drawbacks, and to provide an improved display characteristic determining device which can determine an accurate tone reproduction of a display device while not requiring a user to perform an adjustment operation onto images displayed on the display device.

In order to attain the above and other objects, the present invention provides a display characteristic determining device for determining a display characteristic of a display, comprising: storage means for previously storing test image data comprised of at least three tone levels; control means for controlling a display to display the test image data, the display having a display characteristic; input means for allowing a user to visually perceive the test image data appearing on the display and to input his/her perceived result; and calculation means for calculating, based on the inputted result, the display characteristic of the display. The test image data may be constructed to display a predetermined shape. The test image data may be constructed to display a shape corresponding to a display characteristic of the display. The input means may allow a user to input name of his/her perceived shape displayed on the display.

According to another aspect, the present invention provides an image display and print device for displaying an input image data and for printing the input image data, the device comprising: storage means for storing input image data; display means for displaying the input image data; print means for printing the input image data; storage means for previously storing test image data comprised of at least three tone levels; control Means for controlling the display means to display the test image data; input means for allowing a user to visually perceive the test image data appearing on the display means and to input his/her perceived result; calculation means for calculating, based on the inputted result, display characteristic of the display means; and conversion characteristic calculation means for calculating, based on the calculated display characteristic of the display means, a color conversion characteristic for converting the input image data into print data to be printed by the print means so that the print means prints the input image data in the same color as the input image data displayed on the display means. The image display and print device may further comprise conversion means for converting, based on the calculated color conversion characteristic, the input image data into print data, the print means printing the print data so that the print means prints the input image data in the same color as the input image data displayed on the display means.

According to still another aspect, the present invention provides a method of displaying and printing an input image data, the method comprising the steps of: controlling a display to display input image data, the display having a display characteristic; controlling the display to display test image data comprised of at least three tone levels; allowing a user to visually perceive the test image data appearing on the display and to input his/her perceived result; calculating, based on the inputted result, the display characteristic of the display; and calculating, based on the calculated display characteristic of the display, a color conversion characteristic for converting the input image data into print data to be printed by a printer so that the printer prints the input image data in the same color as the input image data displayed on the display. The method may further comprise the steps of: converting, based on the calculated color conversion characteristic, the input image data into print data; and printing the print data in the same color as the input image data displayed on the display means.

BRIEF DESCRIPTION OF THE DRAWINGS

The above and other objects, features and advantages of the invention will become more apparent from reading the following description of the preferred embodiment taken in connection with the accompanying drawings in which:

FIGS. 11(a), 11(b), and 11(c) show how to produce color-conversion characteristic data, in which FIG. 11(a) shows a monitor profile, FIG. 11(b) shows a printer profile, and FIG. 11(c) shows a flowchart indicative of how to produce color-conversion characteristic data;

FIG. 14(a) shows one example how image data for determining the black point value is constructed from six different tone levels;

FIGS. 14(b)–14(f) show how the image data of FIG. 14(a) appears according to different characteristics of the display;

FIG. 16(a) shows another example how image data is constructed from six different tone levels;

FIGS. 16(b)–16(f) show how the image data of FIG. 16(a) appears according to different characteristics of the display;

DETAILED DESCRIPTION OF THE PREFERRED EMBODIMENT

Figure 1:
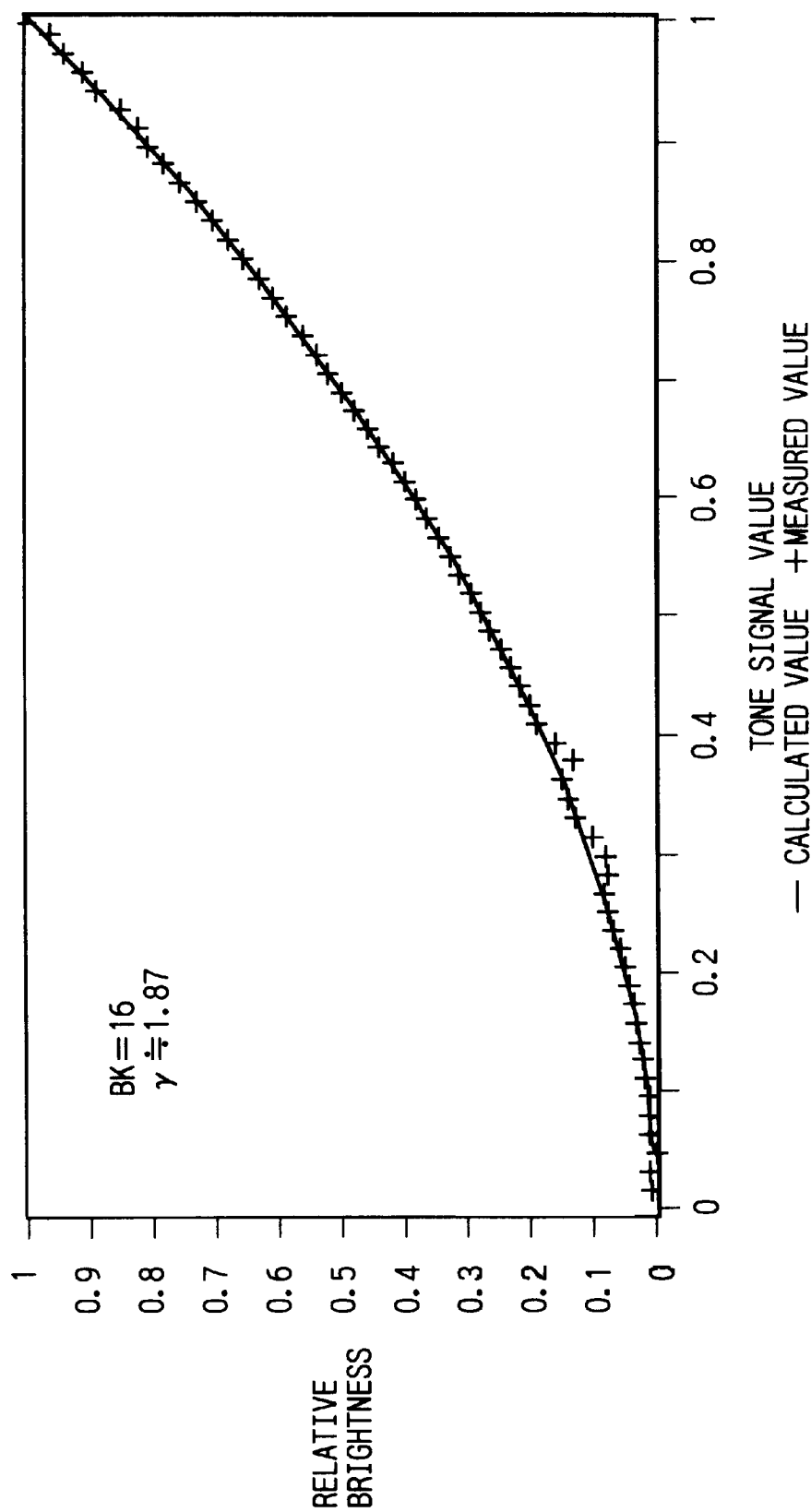
FIG. 1 is a graph showing a concrete example of tone reproduction of a display device of one type.
Figure 2:
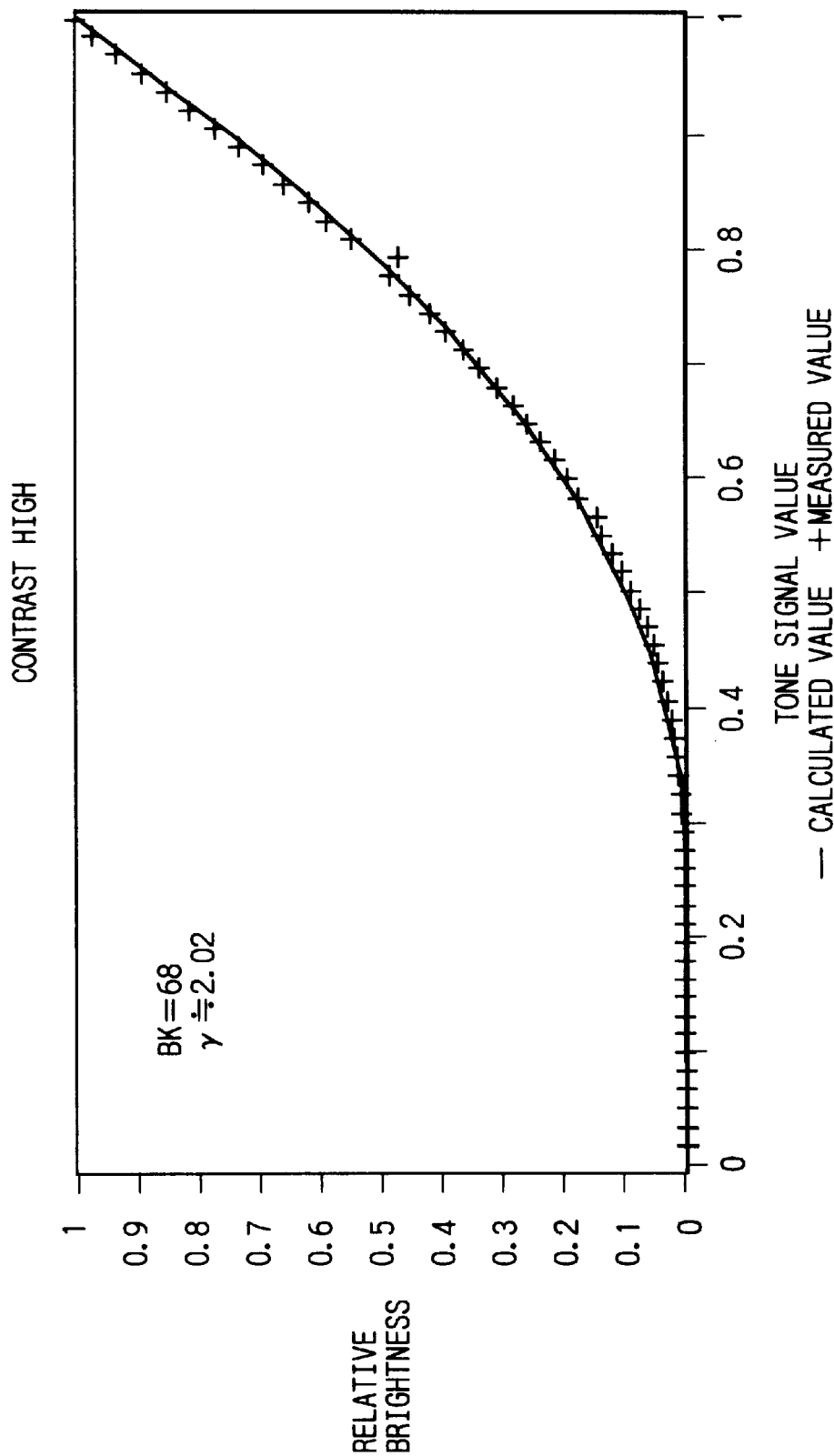
FIG. 2 is a graph showing another concrete example of tone reproduction of a display device of another type where its contrast is adjusted as high.
Figure 3:
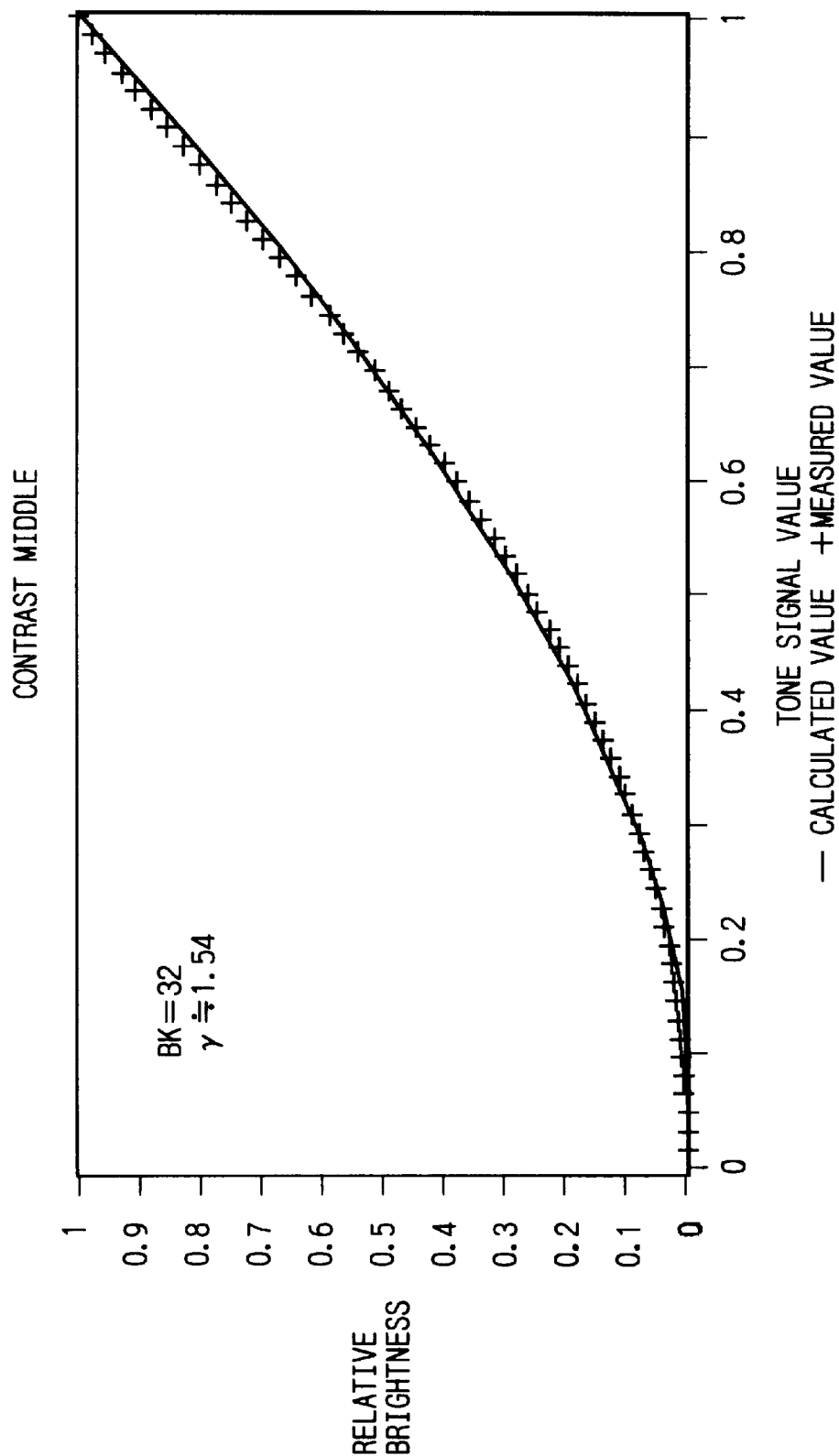
FIG. 3 is a graph showing a concrete example of tone reproduction of the display device of FIG. 2 where its contrast is adjusted as middle.
Figure 4:
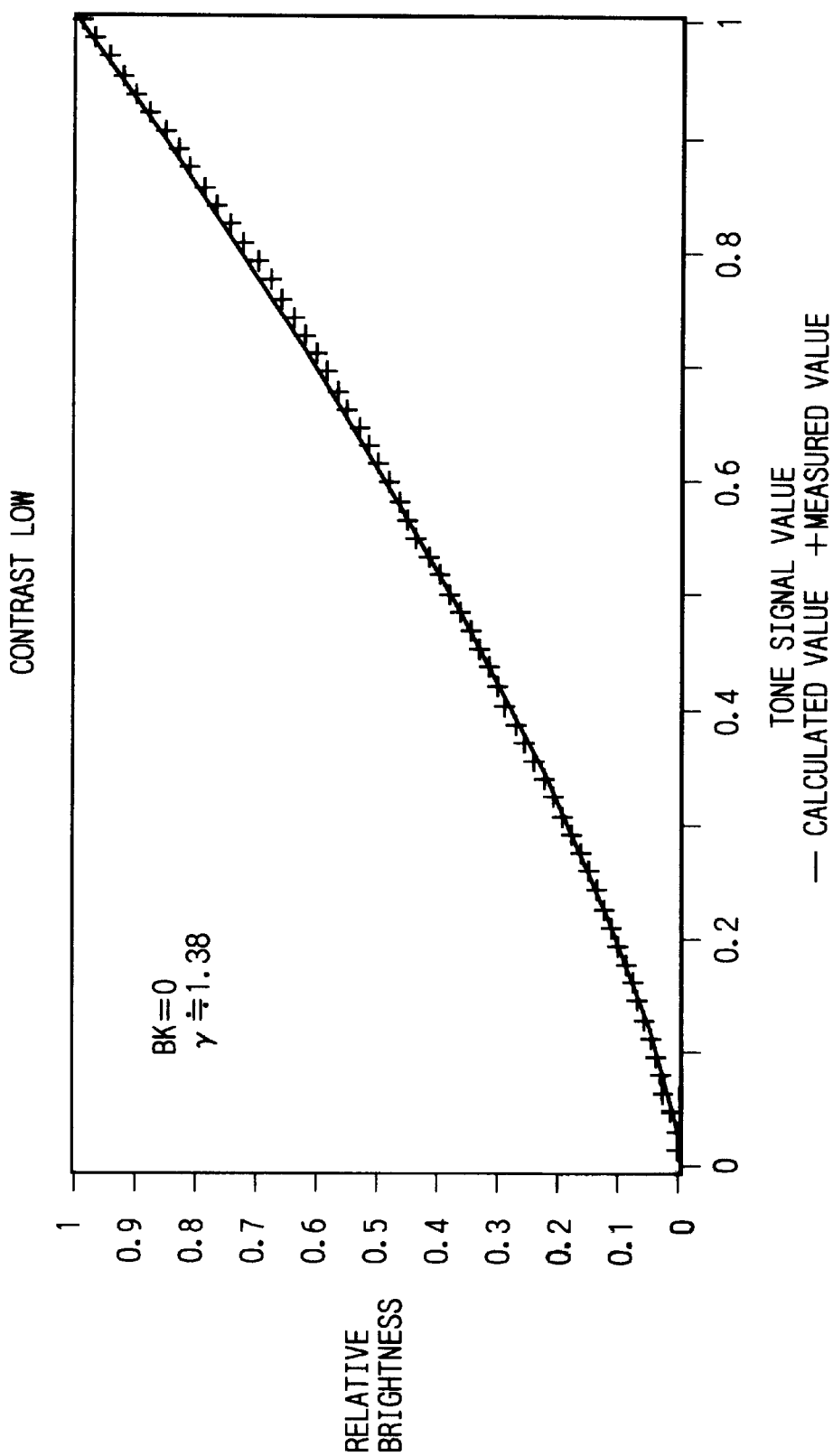
FIG. 4 is a graph showing a concrete example of tone reproduction of the display device of FIG. 2 where its contrast is adjusted as low.

A display characteristic determining device according to a preferred embodiment of the present invention will be described while referring to the accompanying drawings wherein like parts and components are designated by the same reference numerals.

Figure 9:
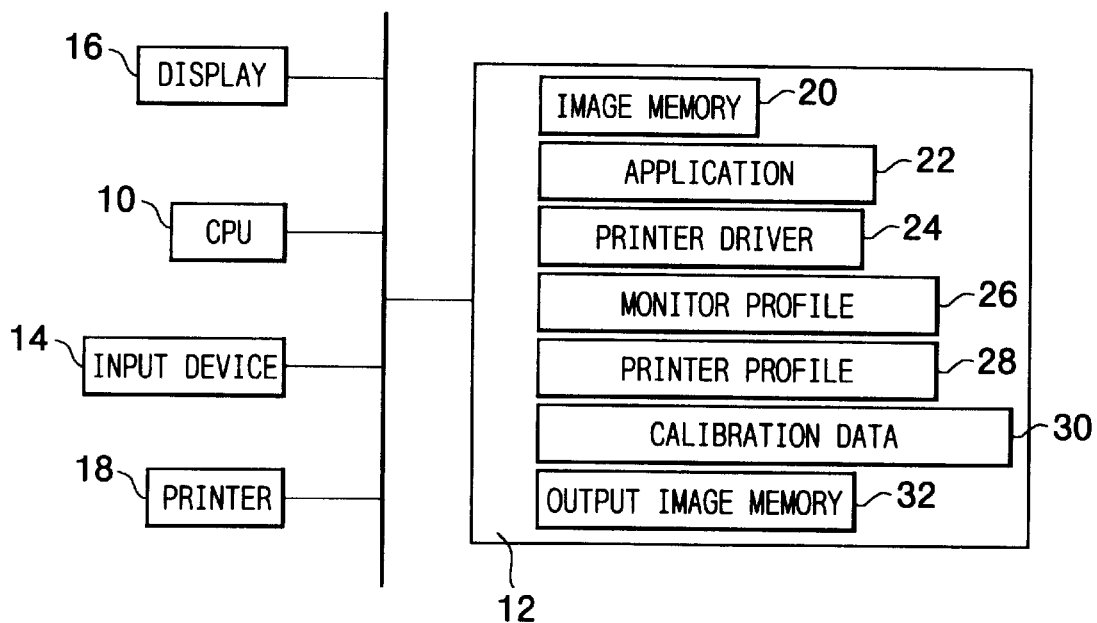
FIG. 9 is a block diagram showing a printing system employing a display characteristic determining device of an embodiment of the present invention.

First, a printing system employing the display characteristic determining device of the present invention will be described below with reference to FIG. 9.

The printing system is constructed from: a CPU 10 for performing various control operations; a storage device 12 such as a hard disk capable of storing data; an input device 14 such as a mouse and a keyboard which a user manipulates to input his/her desired data; a display device 16 such as a CRT; and a printer 18, which are connected to one another via bus or the like. It is noted that the CPU 10, at least a part of the storage device 12, and the input device 14 construct the display characteristic determining device of the present invention.

The storage device 12 includes: an image memory 20 for storing image data to be displayed on the display device 16; an application program portion 22 storing several application programs to be executed to produce and edit image data; a printer driver 24 storing a program for calibrating the display 16 and for controlling the printer 18 to print the image data stored in the image memory 20; a monitor profile 26 storing data indicative of display characteristic of the display device 16; a printer profile 28 storing data indicative of color reproduction of the printer 18; calibration data storage 30 storing data for examining changes in the display characteristic of the display device 16; and an output image memory 32 for temporarily storing image data for being printed by the printer 18.

Figure 11:
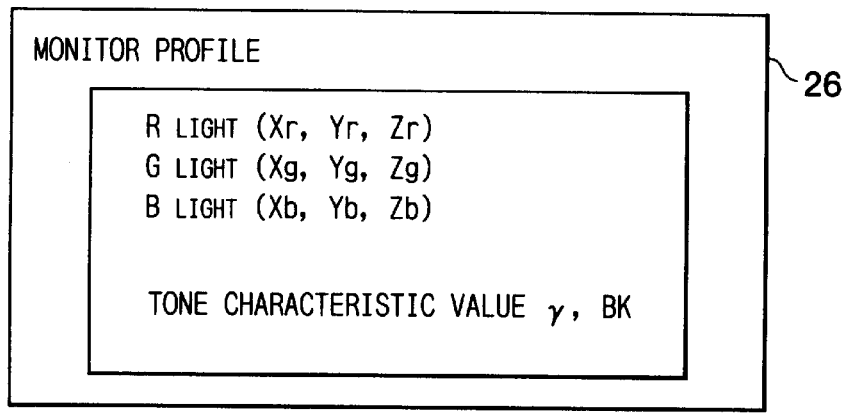
Figure 11:
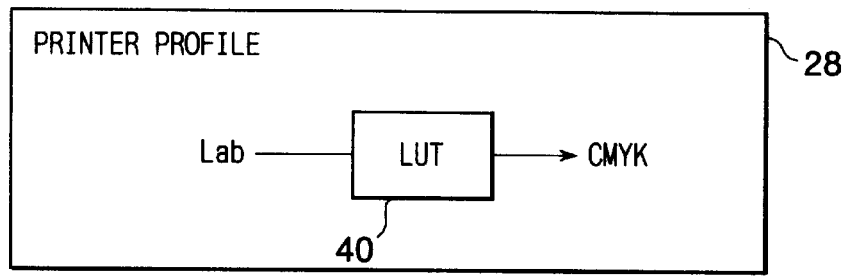
Figure 11:
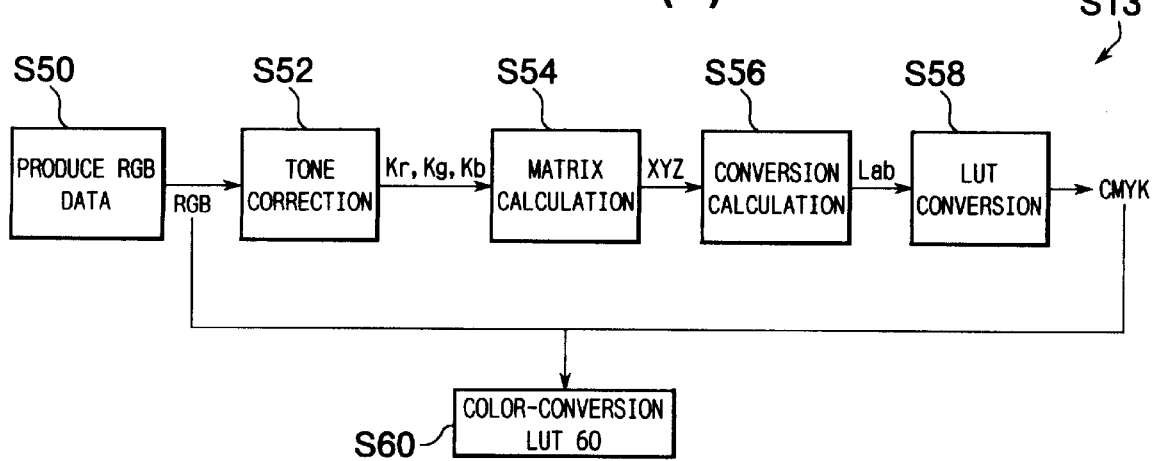

As shown in FIG. 11(a), the monitor profile 26 stores therein: values γ and BK indicative of the tone reproduction of the display 16; and three stimulus value sets (Xr,Yr,Zr), (Xg,Yg,Zg), and (Xb,Yb,Zb). The values γ and BK are defined by the formula (1); The stimulus value set (Xr,Yr,Zr) indicates a stimulus value of a red primary color emitted from the monitor 16. The stimulus value set (Xg,Yg,Zg) indicates a stimulus value of a green primary color emitted from the monitor 16. The stimulus value set (Xb,Yb,Zb) indicates a stimulus value of a blue primary color emitted from the monitor 16.

The printer profile 28 stores therein a look up table (LUT) 40 whose function is illustrated in FIG. 11(b). The LUT 40 includes a plurality of sets of data to be used for converting Lab values (Li, ai, bi) defined in the $CIE1976-L^*a^*b^*$ calorimetric system into print control signals (Ci, Mi, Yi, Ki) for controlling the printer 18.

The LUT 40 is described below in greater detail.

A three-dimensional $L^*a^*b^*$ calorimetric system space is defined as a color space where an L axis, an $a^*$ axis, and a $b^*$ axis extend perpendicularly to one another. The $L^*a^*b^*$ calorimetric system space is divided by a lattice into a plurality of rectangular parallelepipeds. Vertex points of the plural rectangular parallelepipeds are arranged as a plurality of lattice points. The LUT 40 stores therein a plurality of sets of Lab values (Li, ai, bi) indicative of the respective lattice points. The LUT 40 also stores therein a plurality of sets of CMYK control signal values (Ci, Mi, Yi, Ki) in correspondence with the plurality of sets of Lab values (Li, ai, bi). Each set of CMYK control signal values (Ci, Mi, Yi, Ki) is determined as a control signal for controlling the printer 18 to reproduce the same color as that of a corresponding lattice point (Li, ai, bi) defined in the $L^*a^*b^*$ calorimetric space. Details of the LUT 40 are described in co-pending U.S. patent application Ser. No. 08/751,554, the disclosure of which is hereby incorporated by reference.

Figure 10:
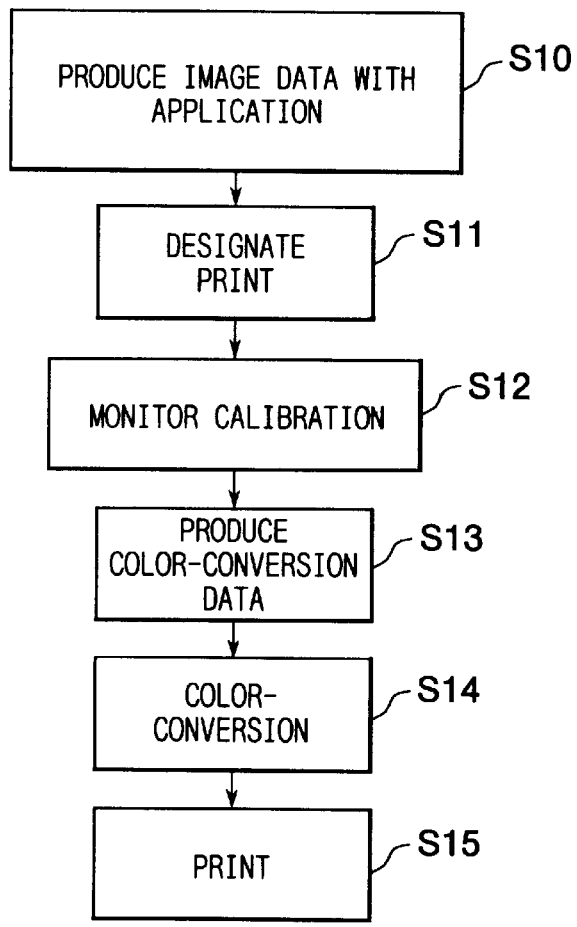
FIG. 10 is a flowchart of a printing operation of the printing system of FIG. 9.

With the above-described structure, the printing system operates as shown in the flowchart of FIG. 10.

First, in S10, the CPU 10 reads out one or more programs from the application program portion 22. Based on the read out program, the CPU 10 controls the storage portion 12 and the display device 16. The CPU 10 gradually analyzes information inputted from the input device 14 and produces image data. The thus produced image data is stored in the image memory 20 and is displayed by the display device 16 so that the user visually confirms his/her produced image. When the CPU 10 detects the user's input of print instruction from the input device 14 in S11, the CPU 10 reads out the printing program from the printer driver 24, and calibrates or corrects data in the monitor profile 26 in S12.

Next, in S13, the CPU 10 reads out the corrected data from the monitor profile 26 and reads out data from the printer profile 28. The CPU 10 then calculates color conversion characteristic to be used for converting image data, stored in the image memory 20, into print data. For example, the thus calculated color conversion characteristic is in the form of data arranged in a color-corrected look up table (LUT) 60. This process of S13 will be described later. Then, in S14, the image data stored in the image memory 20 is converted with the color conversion characteristic (color-corrected look up table data) 60, and the converted image data is stored as print data in the output image memory 32.

The color converting process of S14 can employ various methods such as methods disclosed in Japanese Patent Publication No. 59-41227 and U.S. Pat. No. 4,959,711.

Then, in S15, the CPU 10 transmits the print data from the output image memory 32 to the printer 18, where the print data is printed into an output image.

Figure 12:
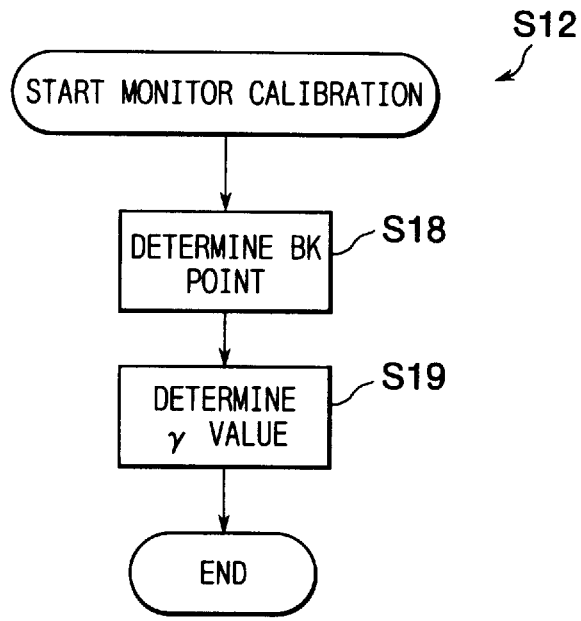
FIG. 12 is a flowchart of a monitor calibration process.

Next, the monitor calibration process of S12 will be described in greater detail with reference to FIG. 12.

First, in S18, the value of a black point BK of the monitor 16 is determined and stored in the monitor profile 26, and then the gamma value γ of the monitor 16 is determined and stored in the monitor profile 26 in S19. Thus, the monitor calibration is performed to calibrate or correct the tone characteristics BK and γ which are previously stored in the monitor profile 26 as shown in FIG. 11(a) into those of the presently-employed display 16.

Figure 13:
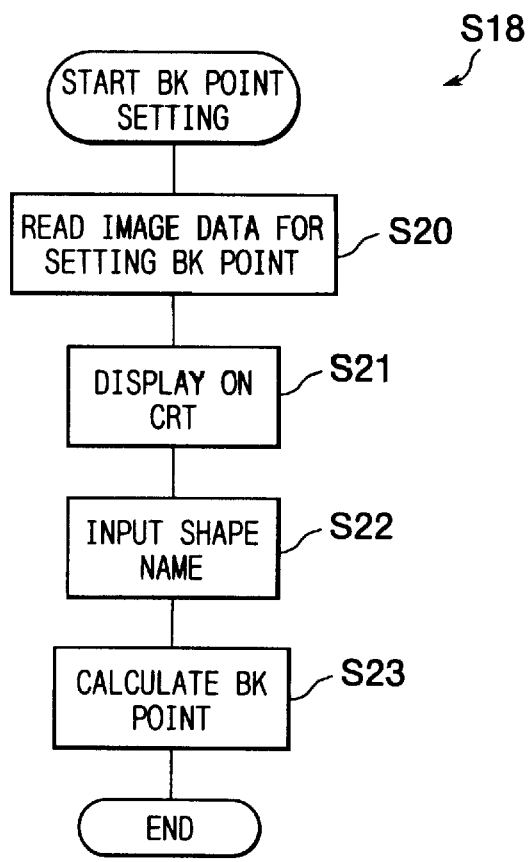
FIG. 13 is a flowchart of a black point determining process during the monitor calibration process.

The BK value setting process of S18 will be first described below with reference to FIG. 13.

First, in S20, the CPU 10 reads out, from the calibration data 30, image data for determining the BK value. This image data is constructed from data indicative of at least three tone levels for displaying a specific shape (i.e., composite image) on the display device 16. For example, the image data is constructed to indicate an image as shown in FIG. 14(a). The image data is indicative of six image regions A through F. It is now assumed that each color component of RGB image data (R, G, B) inputtable to the display device 16 has either one of 256 tone levels 0 to 255. In this case, the image region A is formed by a tone level of zero (0). The image region B is formed by a tone level of two (2). The image region C is formed by a tone level of four (4). The image region D is formed by a tone level of six (6). The image region E is formed by a tone level of eight (8). The image region F is formed by a tone level of ten (10). Each of the image regions A through F is therefore produced by RGB data (R, G, B) where each of the components R, G, and B has a corresponding tone level. For example, the image region A is produced by RGB data (R, G, B) where R=G=B=0. Thus, the image data is formed by six different tone levels in total.

Then, in S21, the CPU 10 controls the display 16 to show the image data. It is now assumed that the display device 16 has a display characteristic of either one of display characteristics A through D shown in FIG. 15. In more concrete terms, according to the display characteristic, the emission intensity, i.e., brightness of the display 16 changes according to the tone level of a signal inputted to the display 16. The changing tendency, i.e., the tone reproduction of the display 16, however, varies according to the type of the display device 16 and varies in time. The tone reproduction is either one of tendencies A through D.

It is now assumed that the display 16 has the tone reproduction A where the brightness rapidly changes when the tone level changes a little from the value of zero (0). In this case, the image data displayed on that display 16 appears as shown in FIG. 14(b) when viewed by the user. That is, the user perceives difference in brightness between the region A (tone level of zero (0)) and the region B (tone level of two (2)). The user therefore perceives a large circle on the display 16.

Figure 15:
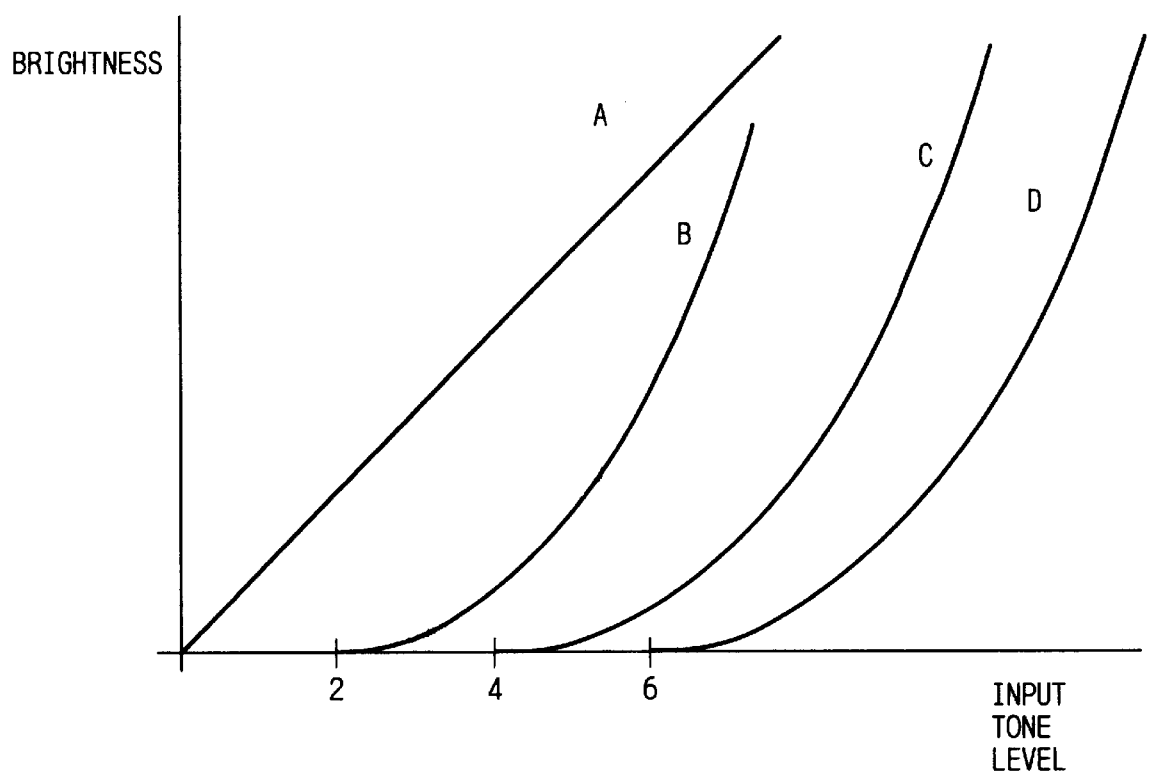
FIG. 15 is a graph indicative of four different display characteristics exhibitable by a display device.

It is next assumed that the display 16 has a tone reproduction D in FIG. 15. In this case, the brightness of the display 16 will not increase from a zero value even though the tone level of the input signal increases to reach the value of six (6). The emission intensity will greatly increase as the tone level increases from six (6). In this case, as shown in FIG. 14(e), the user perceives no difference in brightness among the regions A through D. The user perceives difference in brightness between the regions A through D and the region E (tone level of eight (8)). The user will therefore perceive an ellipse as shown in FIG. 14(e).

In the similar manner, when the display 16 has a tone reproduction B shown in FIG. 15, the user will perceive a rectangle as shown in FIG. 14(c). When the display 16 has a tone reproduction C shown in FIG. 15, the user will perceive a triangle as shown in FIG. 14(d). When the display 16 has such a tone reproduction that the brightness will not increase from a zero value until the tone level increases to reach a value of eight (8), but will increase as the tone level increases from eight, the user will perceive no difference in brightness between the regions A through E. The user will perceive a small circle as shown in FIG. 14(f). The image data of FIG. 14(a) is thus prepared to show different shapes when displayed at different display characteristics.

When the user thus visually observes a certain shape on the display device 16, the user inputs the name of the observed shape in the input device 14 in S22. The CPU 10 refers to the inputted shape name, and then determines a black point value BK corresponding to the inputted shape name in S23. It is noted that the calibration data 30 previously stores therein a BK table in which the BK values of 0 to 8 are stored in correspondence with shape names inputtable for the BK values. That is, the BK table stores a BK value of 0 in correspondence with shape names of "large circle", "large round", and the like. The BK table stores a BK value of 2 in correspondence with shape names of "rectangle", "square", and the like. The BK table stores a BK value of 4 in correspondence with shape names of "triangle" and the like. The BK table stores a BK value of 6 in correspondence with shape names of "ellipse" and the like. The BK table stores a BK value of 8 in correspondence with shape names of "small circle", "small round", and the like. Accordingly, when the user inputs "large circle", "large round", or the like, the CPU 10 refers to the BK table and determines that the value BK is equal to zero (0). When the user inputs "rectangle" or the like, the CPU 10 determines that the value BK is equal to two (2). When the user inputs "triangle", the CPU 10 determines that the value BK is equal to four (4). When the user inputs "ellipse", the CPU 10 determines that the value BK is equal to six (6). When the user inputs "small circle", the CPU 10 determines that the value BK is equal to eight (8). Also in S23, the CPU 10 further rewrites the black value BK, stored in the monitor profile 26, with the presently-determined value BK.

Thus, the operator can simply input the name of his/her perceived shape on the display 16. The user does not have to perform complicated adjustment operations. The operability is greatly enhanced.

It is noted, however, that the image data may not be constructed to display those specific shapes as shown in FIG. 14(*a*). For example, the image data may be constructed to display numerical characters or letters as shown in FIG. 16(*a*). In the example of FIG. 16(*a*), a single numerical character (i.e., composite image) is constructed from seven segments B through F. Five different levels 2, 4, 6, 8, and 10 are allotted to the seven segments. That is, the segment B is formed by a tone level of two (2), the segment C is formed by a tone level of four (4), the segment D is formed by a tone level of six (6), the segment E is formed by a tone level of eight (8), and remaining two segments F are formed by a tone level of ten (10). A background area A is formed by a tone level of zero (0).

The image data of FIG. 16(*a*) can obtain the same advantages as those obtained by the image data of FIG. 14(*a*) as described below.

That is, when the display device 16 has a tone reproduction of A shown in FIG. 15, the image data appears as shown in FIG. 16(*b*). The user will therefore perceive a numerical character of eight (8). When the display device 16 has tone reproduction B shown in FIG. 15, the image data appears as shown in FIG. 16(*c*). The user will perceive a numerical character of nine (9). Similarly, when the display device 16 has tone reproduction C shown in FIG. 15, the image data appears as shown in FIG. 16(*d*), and therefore the user will perceive a numerical character of three (3). When the display device 16 has tone reproduction D shown in FIG. 15, the image data appears as shown in FIG. 16(*e*), and therefore the user will perceive a numerical character of seven (7). When the display device 16 has such a tone reproduction that brightness will not increase from zero until the tone level increases to reach eight (8), but will increase as the tone value increases from eight, the image data appears as shown in FIG. 16(*f*), and therefore the user will perceive a numerical character of one (1).

It is noted that in place of the numerical character, the image data may be constructed to display a letter. That is, a letter may be divided into several segments, and may be constructed by different tone levels in the same manner as described above for the numerical character. Also in this case, the same advantages are obtained.

Thus, the same advantages obtained when the image data is constructed to display both shapes (such as a circle and a rectangle) are obtained also when the image data is constructed to display letters or numerical characters. It is noted that those numerical characters and letters have been used by people for a long period of time. Accordingly, when the same letter or numerical character is displayed on the display 16, any user can input the same name for the displayed letter or character. Any user can input the same name regardless of his/her condition. For example, a user may possibly input different names for a single shape. The user may input "circle" and "round" for the same shape of FIG. 14(*b*). The user may input rectangle and "square" for the same shape of FIG. 14(*c*). Accordingly, the BK table stores therein several shape names inputtable for each BK value. Contrarily, when the numerical character is displayed as shown in FIG. 16(*a*), any user will input the single same name for the displayed numeric character. Accordingly, when the image data is prepared to display a letter or character, the user can more easily input the name of his/her perceived shape. The operability is further enhanced. Additionally, because the total number of shape names inputtable by the user into the device is reduced, the structure of the BK table can be simplified. That is, the BK table may be constructed to prepare a single character or letter for each BK value. The process employed by the device can also be simplified. Accordingly, the device can be produced less costly. The user can easily input the shape names stably. The display characteristic setting is enhanced.

Figure 17:
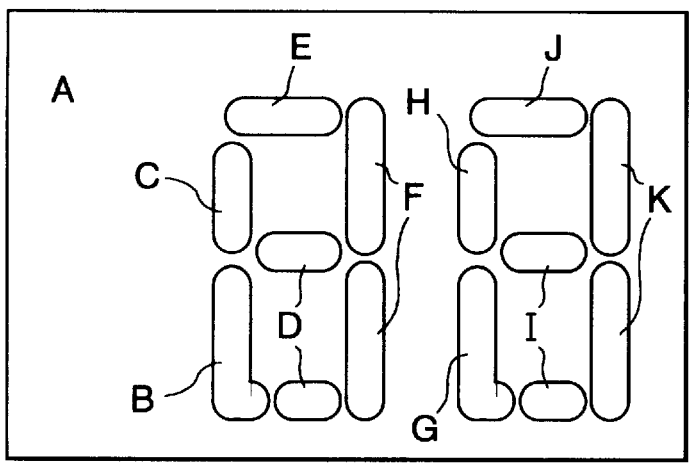
FIG. 17 shows a modification how image data is constructed from eleven different tone levels.

In the above description, image data of FIG. 16(*a*) is constructed from six different levels. However, the image data can be modified to be constructed from much more different levels. For example, as shown in FIG. 17, the image data can be modified to display more than one numerical characters or letters. Each segment in each character or letter is formed by a corresponding tone level. In this example of FIG. 17, the image data is constructed from eleven different tone levels. With this image data, more simple and stable observation can be attained.

Figure 18:
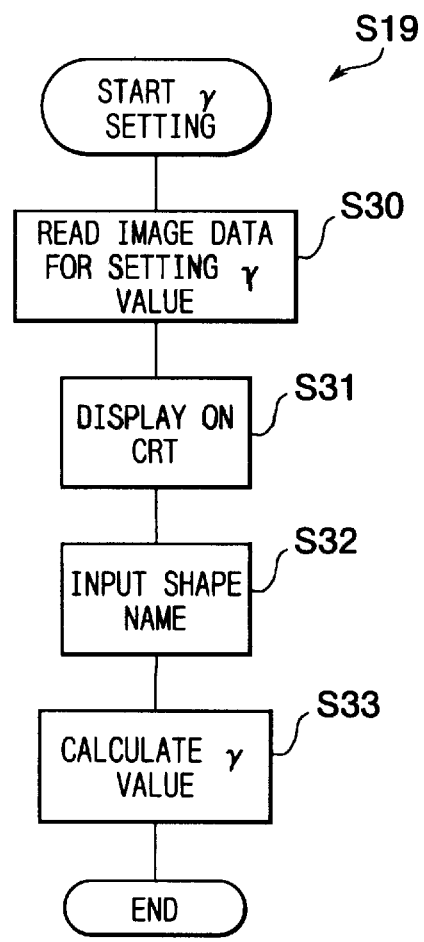
FIG. 18 is a flowchart of a gamma value determining process during the monitor calibration process.

Next, the gamma determination process of S19 will be described below with reference to FIG. 18.

Figure 19:
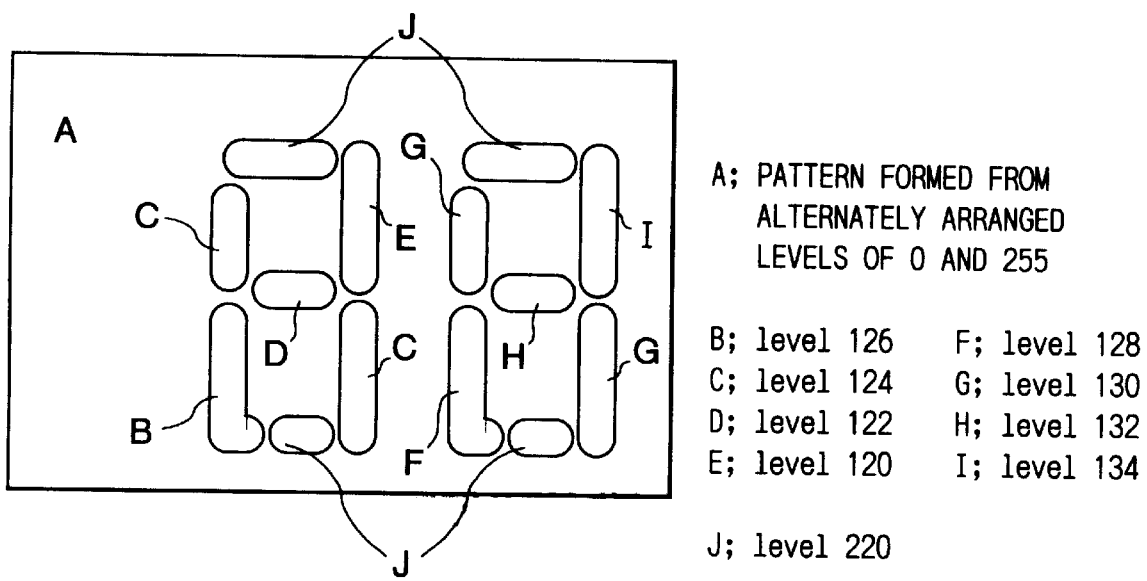
FIG. 19 shows one example how image data for determining the gamma value is constructed.

First, the CPU 10 retrieves image data for determining the gamma value also from the calibration data 30 in S30. The image data is constructed to display a two digit numerical character as shown in FIG. 19.

Figure 5:
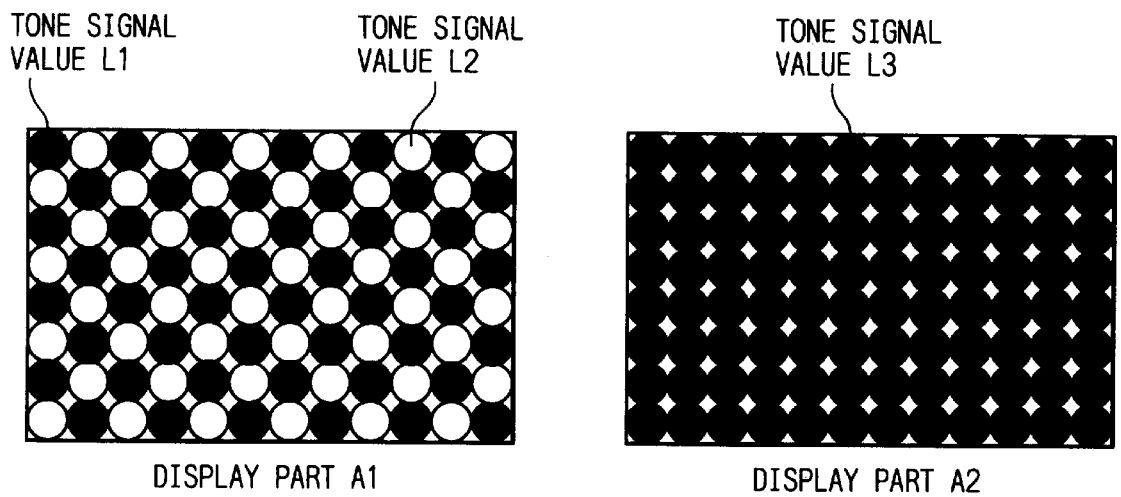
FIG. 5 shows how two display parts are constructed according to a conceivable gamma determining method.
Figure 6:
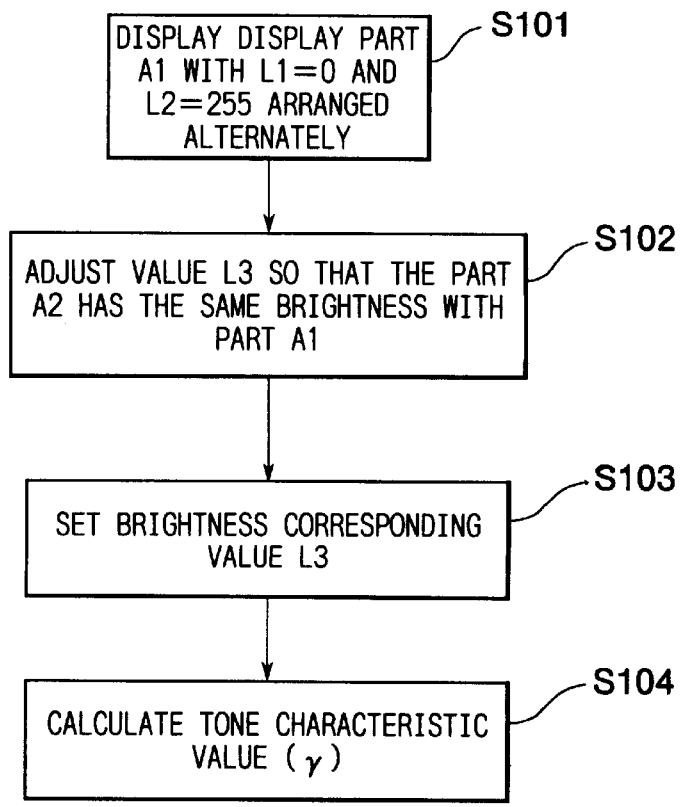
FIG. 6 is a flowchart of determining a gamma value γ according to the conceivable gamma determining method.
Figure 7:
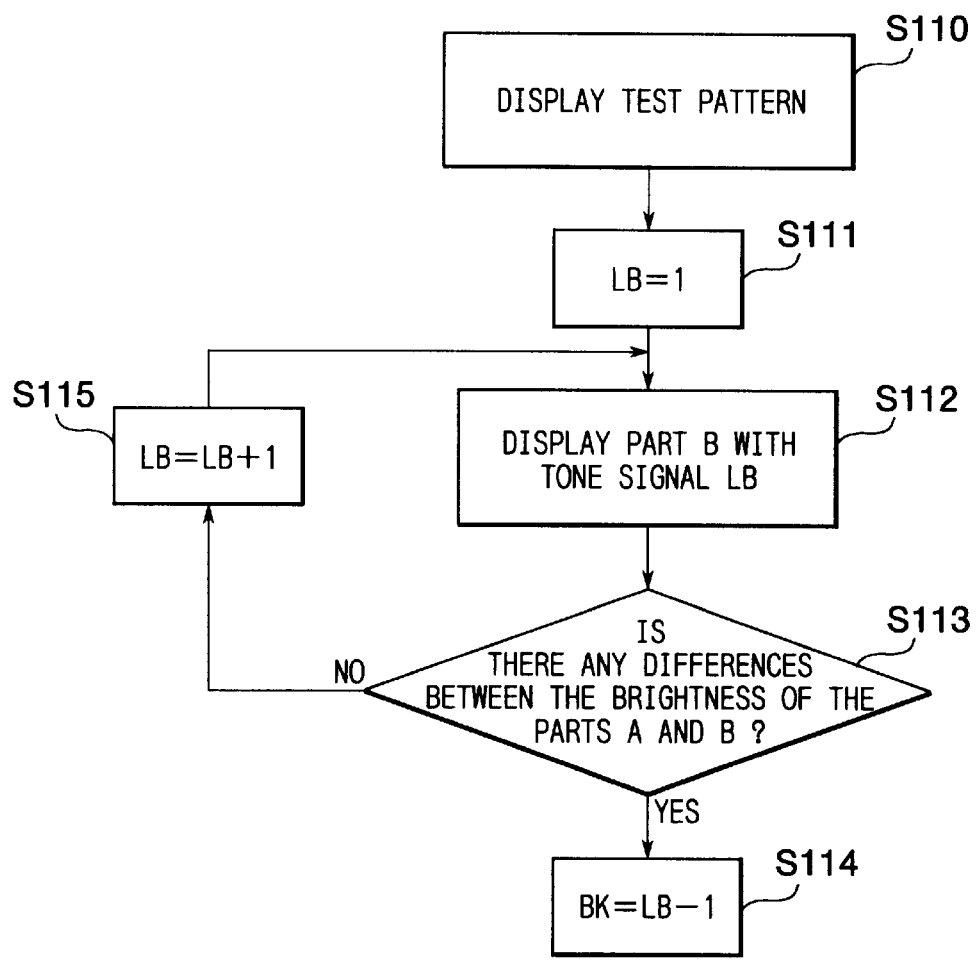
FIG. 7 is a flowchart of determining a black point BK value according to a conceivable black point determining method.
Figure 8:
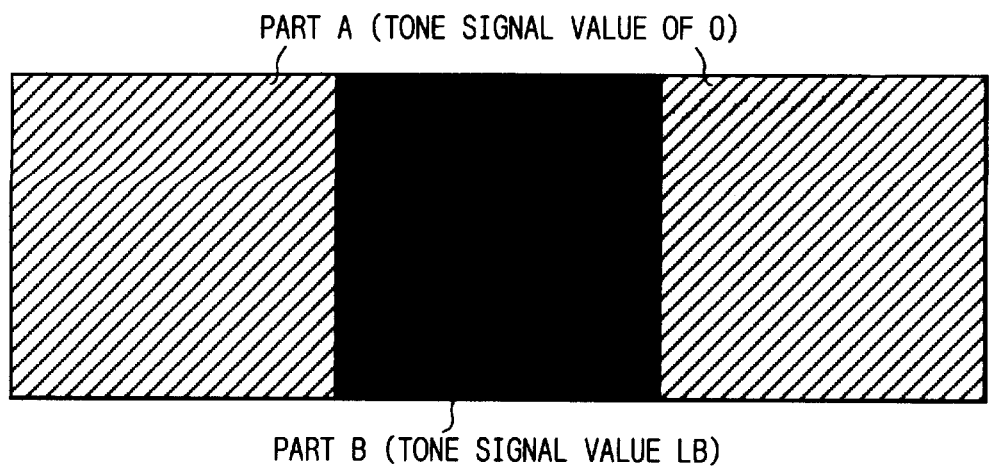
FIG. 8 shows how a display shows a test pattern during the conceivable black point determining method.

In the background portion A, two tone portions of tone levels of zero (0) and 255 are arranged alternately in the same manner as in the display part A1 of the conceivable method shown in FIG. 5. That is, one of the two tone portions is produced by RGB data (R, G, B) where R=G=B=0, and the other tone portion is produced by RGB data (R, G, B) where R=G=B=255. A segment B is constructed from a single tone level of 126. Similarly, another segment C is constructed from a single tone level of 124. The segment D is constructed from a single tone level of 122. The segment E is constructed from a single tone level of 120. The segment F is constructed from a single tone level of 128. The segment G is constructed from a single tone level of 130. The segment H Is constructed from a single tone level of 132. The segment I is constructed from a single tone level of 134. The segment J is constructed from a single tone level of 220. That is, each of the segments B–J is produced by RGB data (R, G, B) where each of the R, G, and B components has a corresponding tone level. For example, the segment B is produced by RGB data (R, G, B) where R=G=B=126.

The thus constructed image data is displayed by the display device 16 having a certain tone reproduction In S31. The displayed image shape, i.e., the displayed numeral, changes according to the tone reproduction of the display device 16. The brightness of the background portion A will be referred to as "standard brightness" hereinafter. The standard brightness is defined as VA1 of 0.5 in the same manner as described already for S103 in the conceivable process.

Figure 20:
FIGS. 20(a) shows a standard shape of the image data of FIG. 19.
FIGS. 20(b)–20(i) show how the image data of FIG. 19 appears according to different tone reproduction characteristics of the display.
Figure 20:
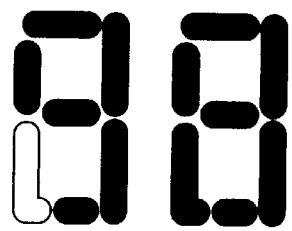
Figure 20:
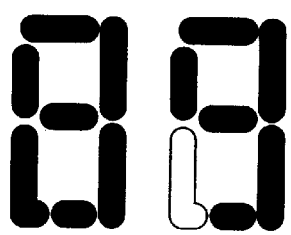
Figure 20:
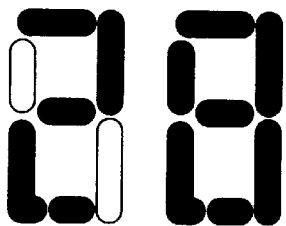
Figure 20:
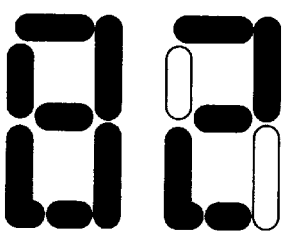
Figure 20:
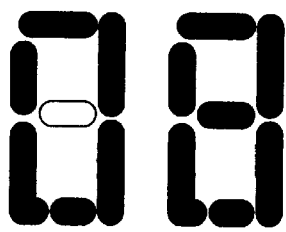
Figure 20:
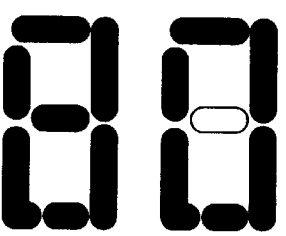
Figure 20:
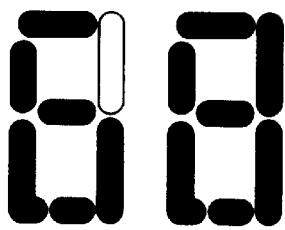
Figure 20:
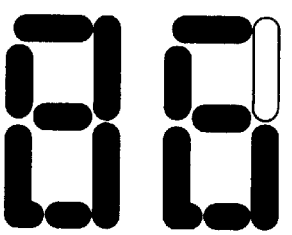

As shown in FIG. 20(*a*), the image data is constructed to indicate a numeral "88" as a standard pattern. As shown in FIGS. 20(*b*)–20(*i*), the user will perceive eight different patterns according to the tone reproduction characteristic of the display device 16. For example, when the display device 16 has such a characteristic that the tone level of 126 exhibits the same brightness as the standard brightness, the user will perceive the displayed image as a numeral "98" as shown in FIG. 20(b). When the display device 16 has such a characteristic that the tone level of 124 exhibits the same brightness as the standard brightness, the user will perceive the displayed image as a numeral "28" as shown in FIG. 20(c). When the display device 16 has a characteristic that the tone level of 122 exhibits the same brightness as the standard brightness, the user will perceive the displayed image as a numeral "08" as shown in FIG. 20(d). When the display device 16 has such a characteristic that the tone level of 120 exhibits the same brightness as the standard brightness, the user will perceive the displayed image as a numeral "68" as shown in FIG. 20(e). When the display device 16 has a characteristic that the tone level of 128 exhibits the same brightness as the standard brightness, the user will perceive the displayed image as a numeral "89" as shown in FIG. 20(f). When the display device 16 has a characteristic that the tone level of 130 exhibits the same brightness as the standard brightness, the user will perceive the displayed image as a numeral "82" as shown in FIG. 20(g). When the display device 16 has a characteristic that the tone level of 132 exhibits the same brightness as the standard brightness, the user will perceive the displayed image as a numeral "80" as shown in FIG. 20(h). When the display device 16 has such a characteristic that the tone level of 134 exhibits the same brightness as the standard brightness, the user will perceive the displayed image as a numeral "86" as shown in FIG. 20(i).

In the above description, image data is prepared to enable the user to compare only eight levels with the standard brightness. However, the image data can be modified to display more than two digit numbers, thereby enabling the user to compare more than eight levels with the standard brightness.

Then, in S32, the user manipulates the input device 14 to input the name of his/her perceived shape, i.e., his/her perceived numeral. Based on the inputted shape name, the CPU 10 determines a tone level which exhibits the same brightness as the standard brightness. Then, in S33, the CPU 10 calculates the gamma value γ based on the determined tone level. That is, the presently-determined tone level, the already-determined black point BK, and the brightness value VA1 are substituted for the values L, BK, and V in the following formula:

$$\gamma = \log(V)/\log\{(L-BK)/(255-BK)\} \quad (6)$$

This calculating process is substantially the same as that in S104 in the conceivable process. Then, the CPU 10 rewrites the gamma value, stored in the monitor profile 26, with the presently-determined gamma value.

Thus, in order to determine which tone level exhibits the same brightness as that of the standard brightness, it is sufficient that the user determine shape of his/her perceived image displayed on the display device 16. The user does not have to perform the brightness comparing operations as achieved in the conceivable process.

Figures 21, 22:
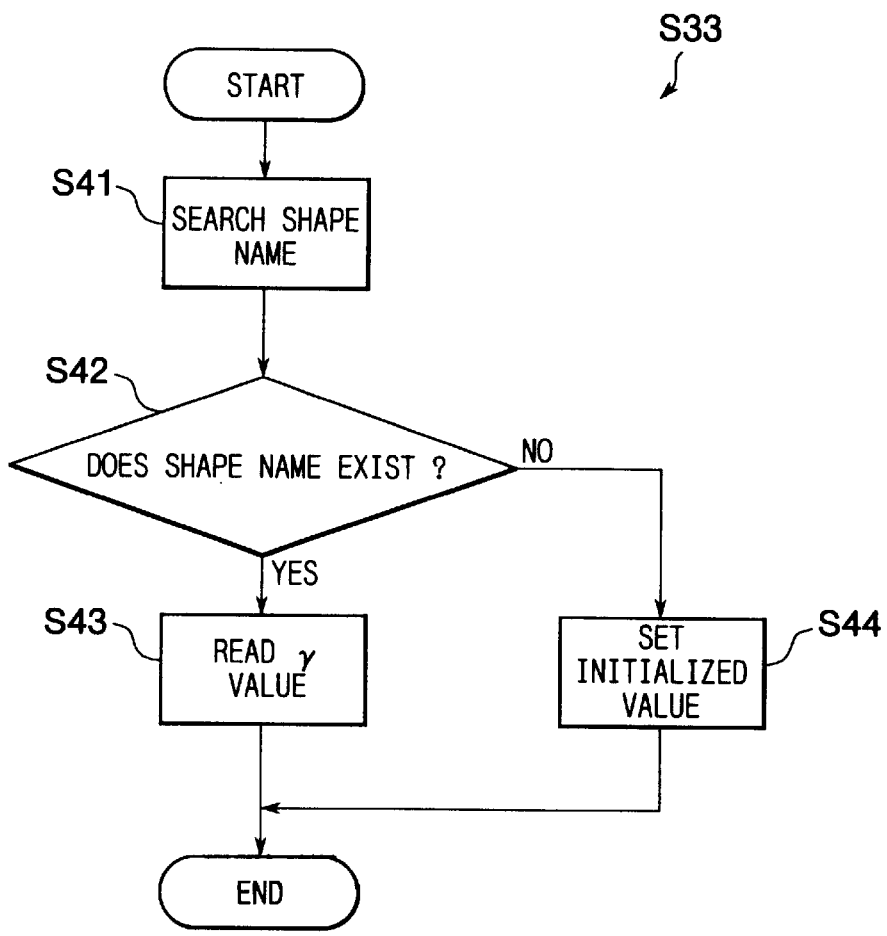
FIG. 21 is a flowchart indicating how to set a γ value.
FIG. 22 shows a storage region how a plurality of γ values are previously stored in correspondence with a plurality of inputtable shape names.

It is noted that the values γ and BK may be determined in another manner as shown in FIG. 21. FIG. 21 is a flowchart of one example of a method for determining the gamma value γ in S33. It is noted that the gamma value γ can be determined through the above formula (6) when a tone level exhibiting the same brightness as the standard brightness is determined. Accordingly, a plurality of gamma values γ can be previously determined in correspondence with a plurality of different tone levels that may produce the same brightness as the standard brightness.

More specifically, a plurality of names of shapes inputtable by the user are previously determined. A plurality of tone levels which produce the same brightness as the standard brightness are also previously determined. Based on the determination, a plurality of gamma values γ (or a plurality of data sets for calculating gamma values γ) are previously stored in correspondence with a plurality of inputtable shape names, i.e., a plurality of inputtable numerals. Those data are stored as a table in a specific region (not shown) of the storage device 12 as shown in FIG. 22.

During the gamma value γ determination process of S33, when the CPU 10 receives the inputted shape name, the CPU 10 searches the storage region of FIG. 22 in S41 to search out the inputted shape name. The CPU 10 then judges whether the inputted shape name is stored in the storage region of FIG. 22 in S42. When the inputted shape name is stored in the storage region (yes in S42), the CPU 10 retrieves a gamma value γ that is stored in correspondence with the inputted shape name in S43. When the inputted shape name is not stored in the storage region (no in S42), the CPU 10 sets, as the gamma value γ, a previously-set initialization value of 1.8.

Because the inputtable shape names and gamma values γ are previously stored in correspondence with each other, the CPU 10 can determine the gamma value γ within a shorter period of time. When the user inputs any shape names not stored in the device, the CPU 10 sets the initialization value as the gamma value γ. Accordingly, the device is prevented from erroneously determining any unsatisfied gamma values even when the user inputs any unexpected shape names. The device is prevented from greatly deteriorating its image quality.

Next, the process of S13 will be described in greater detail with reference to FIG. 11(c).

First, in S50, the CPU 10 produces a plurality of sets of RGB data (R, G, B) whose R, G, and B values are respectively arranged at the interval of 16. That is, the values R in the plurality of sets of RGB data are arranged at 0, 16, 32, 48, . . . , and 255. The values G in the plurality of sets of RGB data are arranged at 0, 16, 32, 48, . . . , and 255. The values B in the plurality of sets of RGB data are also arranged at 0, 16, 32, 48, . . . , and 255. Then, the tone of each RGB data is tone-corrected in S52 with the use of the tone characteristic values γ and BK presently stored in the monitor profile 26. This tone-correction operation is expressed by the following equations [A]:

$$Kr = ((R-BK)/(255-BK))^\gamma$$
$$Kg = ((G-BK)/(255-BK))^\gamma \quad [A]$$
$$Kb = ((B-BK)/(255-BK))^\gamma$$

where R, G, and B are red, green, and blue components of each RGB data set (R, G, B) produced by the CPU 10 in S50, and Kr, Kg, and Kb are tone-corrected data.

Next, in S54, the CPU 10 performs a matrix calculation operation on the tone-corrected data (Kr, Kg, Kb) with the use of the three stimulus value sets stored in the monitor profile 26, thereby obtaining a XYZ value set (X,Y,Z) defined in the CIE-1976 XYZ colorimetric system. In more concrete terms, the tone-corrected value set (Kr, Kg, Kb) is converted into a XYZ value set (X, Y, Z) in the following formula [B]:

$$X = Kr^* Xr + Kg^* Xg + Kb^* Xb$$

$$Y = Kr^* Yr + Kg^* Yg + Kb^* Yb \qquad [B]$$

$$Z = Kr^* Zr + Kg^* Zg + Kb^* Zb$$

Then, in S56, the XYZ data set (X, Y, Z) is converted into an Lab data set (L, a, b) defined in the CIE-1976 $L^* a^* b^*$ colorimetric system through the following formula which is defined in the JIS Z 8729:

$$L^* = 116 (Y/Yn)^{1/3} - 16$$

$$a^* = 500 [(X/Xn)^{1/3} - (Y/Yn)^{1/3}]$$

$$b^* = 200 [(Y/Yn)^{1/3} - (Z/Zn)^{1/3}]$$

where Xn, Yn, and Zn are three stimulus values of light reflected from a completely diffusing and reflecting plane defined in the CIE-1976 XYZ colorimetric system.

Figure 23:
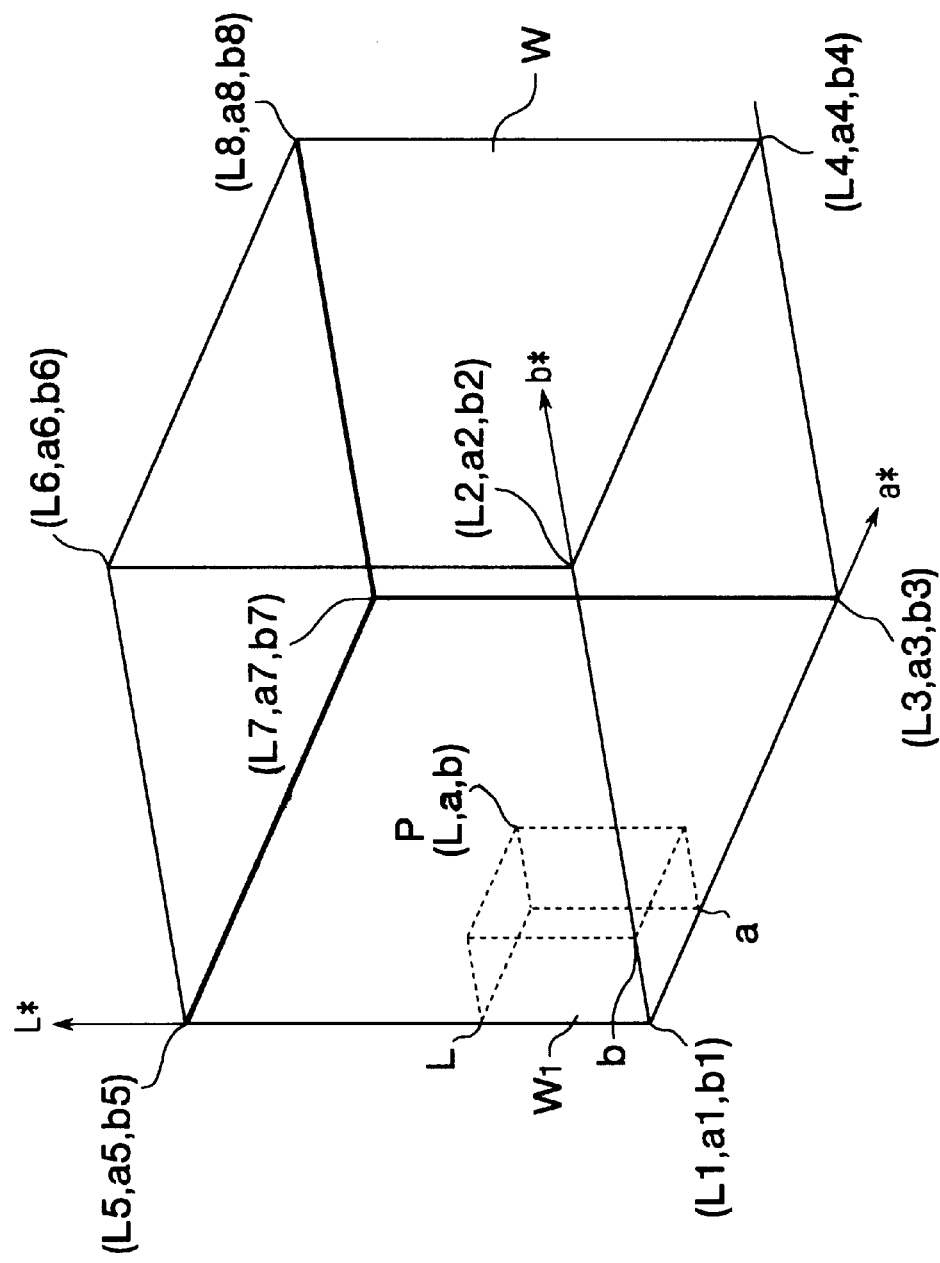
FIG. 23 illustrates how an interpolation calculation is performed in a three-dimensional $L^*a^*b^*$ colorimetric space.

Then, the Lab value set (L, a, b) is converted in S58 into a CMYK value set (C, M, Y, K) with the use of the LUT 40 stored in the printer profile 28. That is, eight lattice points (Li, at, bi), that surround a color point P indicated by the Lab value set (L, a, b), are first determined in the CIE-1976 $L^* a^* b^*$ calorimetric system. That is, eight lattice points (L1, a1, b1) through (L8, a8, b8) surrounding the color point P are determined as shown in FIG. 23. Then, eight sets of CMYK control signal value sets (Ci, Mi, Yi, Ki), stored in the LUT 40 in correspondence with the determined eight lattice points (Li, ai, bi), are retrieved from the LUT 40. Thus, (C1, M1, Y1, K1) through (C8, M8, Y8, K8) are retrieved from the LUT 40. Then, a weighted average for each set of CMYK control signal values (Ci, Mi, Yi, Ki) is calculated through a volume interpolation method. It is assumed that a rectangular parallelepiped W, which surrounds the color point P and which is defined by the eight lattice points (L1, a1, b1) through (L8, a8, b8), has a volume "A". A smaller rectangular parallelepiped W1 is defined as a rectangular parallelepiped having the vertex P and the vertex point (L1, a1, b1) as opposite or diagonal vertex points. It is now assumed that the rectangular parallelepiped W1 has a volume "v1." A weight coefficient for the lattice point (L8, a8, b8) is calculated as a value obtained by dividing the volume "v1" by the volume "A". In a similar manner, although not shown in FIG. 23, smaller rectangular parallelepipeds W2 through W8 are defined to have the vertex point P and the vertex points (L2, a2, b2) through (L8, a8, b8) as the diagonal or opposite vertex points. Weight coefficients for the vertex points opposite to the vertex points (L2, a2, b2) through (L8, a8, b8) are respectively obtained by dividing the volumes "v2" through "v8" of the rectangular parallelepipeds W2 through W8 by the volume "A."

Thus, values C, M, Y, and K in the CMYK value set (C, M, Y, K) are calculated in the following manner:

$$C = (v1 \cdot C8 + v2 \cdot C7 + v2 \cdot C6 + v4 \cdot C5 + v5 \cdot C4 + v6 \cdot C3 + v7 \cdot C2 + v8 \cdot C1)/A$$

$$M = (v1 \cdot M8 + v2 \cdot M7 + v2 \cdot M6 + v4 \cdot M5 + v5 \cdot M4 + v6 \cdot M3 + v7 \cdot M2 + v8 \cdot M1)/A$$

$$Y = (v1 \cdot Y8 + v2 \cdot Y7 + v2 \cdot Y6 + v4 \cdot Y5 + v5 \cdot Y4 + v6 \cdot Y3 + v7 \cdot Y2 + v8 \cdot Y1)/A$$

$$K = (v1 \cdot K8 + v2 \cdot K7 + v2 \cdot K6 + v4 \cdot K5 + v5 \cdot K4 + v6 \cdot K3 + v7 \cdot K2 + v8 \cdot K1)/A$$

Details of the interpolation calculation are described in co-pending U.S. patent application Ser. No. 08/751,554, the disclosure of which is hereby incorporated by reference.

Then, a color-corrected look up table 60 is produced in S60, in which the initially-produced RGB data sets (R, G, B) are stored in correspondence with the finally-produced CMYK data sets (C, M, Y, K). The thus obtained LUT 60 is indicative of the color conversion characteristic appropriate for the relationship between the display 16 and the printer 18, and used in S14.

In more concrete terms, in the LUT 60, a three-dimensional RGB calorimetric system space is defined as a color space where an R axis, an G axis, and a B axis extend perpendicularly to one another. The RGB calorimetric system space is uniformly divided by a lattice into a plurality of rectangular parallelepipeds. Vertex points of the plural rectangular parallelepipeds are arranged as a plurality of lattice points. Every two adjacent lattice points are separated by an equal distance of 16 in each of the R, G, and B axes. The LUT 60 stores therein a plurality of sets of RGB values (R, G, B) indicative of the respective lattice points and inputtable to the display 16. The LUT 60 also stores therein a plurality of sets of CMYK control signal values (C, M, Y, K) in correspondence with the plurality of sets of RGB values (R, G, B). Each set of CMYK control signal values (C, M, Y, K) is produced in S13 as a control signal for controlling the printer 18 to reproduce the same color as that of a corresponding RGB color (R, G, B) displayed on the display 16.

The process in S14 will be described below in greater detail.

Figure 24:
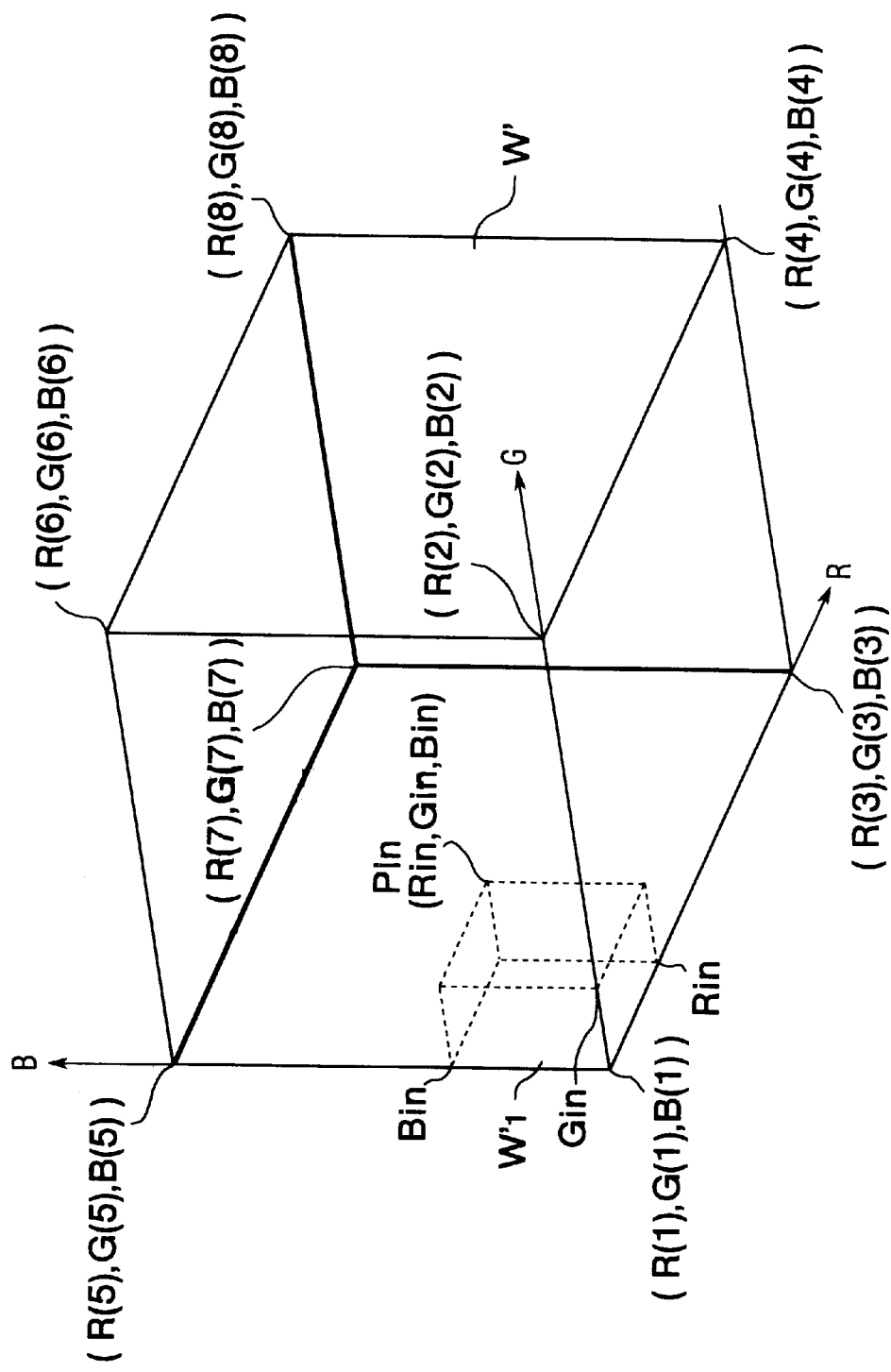
FIG. 24 illustrates how an interpolation calculation is performed in a three-dimensional RGB calorimetric space.

In S14, image data (Rin, Gin, Bin) stored in the image memory 20 is converted with the LUT 60 into CMYK print data (Cout, Mout, Yout, Kout) which will be stored in the output image memory 32. This conversion is performed with the use of LUT 60. That is, eight lattice points (R(i), G(i), B(i)), that surround an input color point Pin indicated by the RGB value set (Rin, Gin, Bin), are first determined in the RGB colorimetric system. That is, eight lattice points (R(1), G(1), B(1)) through (R(8), G(8), B(8)) surrounding the input color point Pin are determined as shown in FIG. 24. Then, eight sets of CMYK control signal value sets (C(i), M(i), Y(i), K(i)), stored in the LUT 60 in correspondence with the determined eight lattice points (R(i), G(i), B(i)), are retrieved from the LUT 60. Thus, (C(1), M(1), Y(1), K(1)) through (C(8), M(8), Y(8), K(8)) are retrieved from the LUT 60. Then, a weighted average for each set of CMYK control signal values (C(i), M(i), Y(i), K(i)) is calculated through a volume interpolation method. It is assumed that a rectangular parallelepiped W', which surrounds the input color point Pin and which is defined by the eight lattice points (R(1), G(1), B(1)) through (R(8), G(8), B(8)), has a volume "A'". A smaller rectangular parallelepiped W1' is defined as a rectangular parallelepiped having the vertex Pin and the vertex point (R(1), G(1), B(1)) as opposite or diagonal vertex points. It is now assumed that the rectangular parallelepiped W1' has a volume "v'1." A weight coefficient for the lattice point (R(8), G(8), B(8)) is calculated as a value obtained by dividing the volume "v'1" by the volume "A'". In a similar manner, although not shown in FIG. 24, smaller rectangular parallelepipeds W2' through W8' are defined to have the vertex point Pin and the vertex points (R(2), G(2), B(2)) through (R(8), G(8), B(8)) as the diagonal or opposite vertex points. Weight coefficients for the vertex points opposite to the vertex points (R(2), G(2), B(2)) through (R(8), G(8), B(8)) are respectively obtained by dividing the volumes "v'2" through "v'8" of the rectangular parallelepipeds W2' through W8' by the volume "A'."

That is, values Cout, Mout, Yout, and Kout in the CMYK value set (Cout, Mout, Yout, Kout) are calculated in the following manner:

$$Cout=(v'1 \cdot C(8)+v'2 \cdot C(7)+v'3 \cdot C(6)+v'4 \cdot C(5)+v'5 \cdot C(4)+v'6 \cdot C(3)+v'7 \cdot C(2)+v'8 \cdot C(1))/A'$$

$$Mout=(v'1 \cdot M(8)+v'2 \cdot M(7)+v'3 \cdot M(6)+v'4 \cdot M(5)+v'5 \cdot M(4)+v'6 \cdot M(3)+v'7 \cdot M(2)+v'8 \cdot M(1))/A'$$

$$Yout=(v'1 \cdot Y(8)+v'2 \cdot Y(7)+v'3 \cdot Y(6)+v'4 \cdot Y(5)+v'5 \cdot Y(4)+v'6 \cdot Y(3)+v'7 \cdot Y(2)+v'8 \cdot Y(1))/A'$$

$$Kout=(v'1 \cdot K(8)+v'2 \cdot K(7)+v'3 \cdot K(6)+v'4 \cdot K(5)+v'5 \cdot K(4)+v'6 \cdot K(3)+v'7 \cdot K(2)+v'8 \cdot K(1))/A'$$

Details of the interpolation calculation are described in co-pending U.S. patent application Ser. No. 08/751,554, the disclosure of which is hereby incorporated by reference.

As described above, according to the present embodiment, a pattern to be displayed on the display is prepared to be constructed from at least three tone levels to display specific shapes such as letters and numeric characters. The pattern is designed so that the user will visually perceive different shapes when displayed at different display characteristics. The user visually perceives the displayed image data and inputs his/her perceived result. The device determines a display characteristic of the display based on the inputted result.

More specifically, the test image data (calibration data 30) is prepared to show: a reference brightness region (background region A in FIGS. 14(*a*), 16(*a*), 17, and 19); and at least two comparative brightness regions (image segments B, C, . . . in FIGS. 14(*a*), 16(*a*), 17, and 19) to be compared with the reference brightness region. The user may simply judge which of the at least two comparative brightness regions has brightness similar to that of the reference brightness region. In other words, the user may judge which of the at least two comparative brightness regions has brightness different from that of the reference brightness region. This simple and easy judgment can allow the device to determine the display characteristic of the display. The number of the comparative brightness regions is determined dependent on accuracy at which the display characteristic of the display is desired to be determined. Because the test image has at least two comparative brightness regions, the device can discriminate between at least two different display characteristics. For example, in the case of FIG. 14(*a*), the test image data (calibration data 30) is prepared to show five comparative brightness regions B through F. Accordingly, the device can discriminate between five display characteristics, i.e., five black points.

Thus, it is sufficient that the user perceives the displayed test image data and inputs his/her perceived result. The user's operation is greatly simplified. The operability of the device is greatly enhanced.

Especially when the plurality of display characteristics are previously stored in correspondence with the plurality of inputtable perceived results, the device can calculate the display characteristic through a simpler process. The structure of and the process employed by the device is simplified.

The user can determine the display characteristic of the display through discriminating between different shapes. Any user can easily discriminate between different shapes and input the names of the discriminated shapes. The device can therefore perform its determination operation easily and stably.

While the invention has been described in detail with reference to the specific embodiment thereof, it would be apparent to those skilled in the art that various changes and modifications may be made therein without departing from the spirit of the invention.

For example, in FIG. 22, the plurality of gamma values γ are stored in correspondence with the plurality of inputtable shape names. However, a plurality of data for calculating the gamma values γ may be previously stored in correspondence with the inputtable shape names. Similarly, in the BK table, a plurality of data for calculating the BK values may be previously stored in correspondence with the inputtable shape names.

What is claimed is:

1. A display characteristic determining device for determining a display characteristic of a display, comprising:

storage means for previously storing test image data representing a predetermined test image, the predetermined test image having at least three image sections to be displayed by at least three different tone levels;

control means for controlling a display to display the test image data, the display having a display characteristic that allows a user to visually perceive at least one image section out of the at least three image sections or the absence of all of the at least three image sections, all of the perceived image sections composing a single composite image, the single composite image forming at least one of an identifiable shape, numerical character and letter;

input means for allowing the user to identify his/her perceived composite image or absence thereof; and calculation means for calculating, based on the identification by the user, the display characteristic of the display.

2. A display characteristic determining device as claimed in claim 1, wherein the calculation means includes:

display characteristic memory means for previously storing a plurality of identifications inputtable by the input means and a plurality of sets of data for calculating corresponding display characteristics; and display characteristic selection means for selecting based on the identification by the user, either one of the plurality of sets of data stored in the display characteristic memory means.

3. A display characteristic determining device as claimed in claim 2, wherein the test image data is for allowing the display to display one of a plurality of different shapes in correspondence with the display characteristic of the display, the input means allowing the user to input name of his/her perceived shape displayed on the display, and wherein the display characteristic memory means previously stores names of the plurality of shapes inputtable by the user through the input means and the plurality of sets of data for calculating corresponding display characteristics, the display characteristic selection means selecting, based on the inputted name, either one of the plurality of sets of data stored in the display characteristic memory means.

4. A display characteristic determining device as claimed in claim 3, wherein the test image data is for allowing the display to display one of the plurality of different shapes in correspondence with the black point of the display, the input means allowing the user to input name of his/her perceived shape displayed on the display, and wherein the display characteristic memory means previously stores names of the plurality of shapes inputtable by the user through the input means and the corresponding plurality of black points values, the display characteristic selection means selecting, based on the inputted name, either one of the plurality of black point values.

5. A display characteristic determining device as claimed in claim 3,
wherein the test image data is for allowing the display to display one of the plurality of different shapes in correspondence with the gamma value of the display, the input means allowing the user to input name of his/her perceived shape displayed on the display, and
wherein the display characteristic memory means previously stores names of the plurality of shapes inputtable by the user through the input means and the corresponding gamma values, the display characteristic selection means selecting, based on the inputted name, either one of the plurality of gamma values.

6. A display characteristic determining device as claimed in claim 1, wherein the test image data is for allowing the display to display a shape corresponding to the display characteristic of the display.

7. A display characteristic determining device as claimed in claim 1, wherein the test image data is for allowing the display to display a shape corresponding to a display characteristic of the display.

8. A display characteristic determining device as claimed in claim 6, wherein the input means is for allowing a user to input name of his/her perceived shape displayed on the display.

9. A display characteristic determining device as claimed in claim 6, wherein the test image data is for allowing the display to display a numerical character corresponding to a display characteristic of the display.

10. A display characteristic determining device as claimed in claim 9, wherein the input means is for allowing a user to input name of his/her perceived numerical character displayed on the display.

11. A display characteristic determining device as claimed in claim 6, wherein the test image data is for allowing the display to display a letter corresponding to a display characteristic of the display.

12. A display characteristic determining device as claimed in claim 11, wherein the input means is for allowing a user to input name of his/her perceived letter displayed on the display.

13. A display characteristic determining device as claimed in claim 1, further comprising:
input image data storage means for storing input image data to be displayed by the display and to be printed by a printer; and
conversion characteristic calculation means for calculating, based on the calculated display characteristic of the display means, a conversion characteristic for converting the input image data for being printed by the print means so that the print means prints the input image data in the same color as the input image data displayed on the display means.

14. An image display and print device for displaying an input image data and for printing the input image data, the device comprising:
storage means for storing input image data;
display means for displaying the input image data;
print means for printing the input image data;
storage means for previously storing test image data representing a predetermined test image, the predetermined test image having at least three image sections to be displayed by at least three different tone levels, each of the at least three image sections constituting the predetermined test image having a corresponding shape and being located at a corresponding position, a plurality of combinations of at least one image section of the at least three image sections representing a plurality of different composite images, the test image data further representing a background area to be displayed at at least one predetermined background tone level;
control means for controlling the display means to display the test image data, the display means having a display characteristic that determines a relationship between displayed brightness of each of the at least three tone levels and displayed brightness of the background tone level, thereby allowing a user to visually perceive on the background area one of the plurality of different composite images or the absence of any composite image corresponding to the display characteristic of the display means, the composite image forming at least one of an identifiable shape, numerical character and letter;
input means for allowing the user to identify his/her perceived composite image or absence thereof;
calculation means for calculating, based on the identification by the user, display characteristic of the display means; and
conversion characteristic calculation means for calculating, based on the calculated display characteristic of the display means, a color conversion characteristic for converting the input image data into print data to be printed by the print means so that the print means prints the input image data in the same color as the input image data displayed on the display means.

15. An image display and print device as claimed in claim 14, further comprising conversion means for converting, based on the calculated color conversion characteristic, the input image data into print data, the print means printing the print data so that the print means prints the input image data in the same color as the input image data displayed on the display means.

16. An image display and print device as claimed in claim 14, wherein the test image data is for allowing the display to display a shape corresponding to the display characteristic of the display.

17. An image display and print device as claimed in claim 16, wherein the input means allows the user to input name of his/her perceived shape displayed on the display.

18. A method of displaying and printing an input image data, the method comprising the steps of:
controlling a display to display input image data, the display having a display characteristic;
controlling the display to display test image data representing a predetermined test image, the predetermined test image having at least three image sections to be displayed by at least three different tone levels, each of the at least three image sections constituting the predetermined test image having a corresponding shape and being located at a corresponding position, a plurality of combinations of at least one image section of the at least three image sections representing a plurality of different composite images, the test image data further representing a background area to be displayed at at least one predetermined background tone level, the display having a display characteristic that determines a relationship between displayed brightness of each of the at least three tone levels and displayed brightness of the background tone level, thereby allowing a user to visually perceive on the background area one of the plurality of different composite images or the absence of any composite image corresponding to the display characteristic of the display, the composite image forming at least one of an identifiable shape, numerical character and letter;

allowing the user to identify his/her perceived composite image or absence thereof;

calculating, based on the identification by the user, the display characteristic of the display; and calculating, based on the calculated display characteristic of the display, a color conversion characteristic for converting the input image data into print data to be printed by a printer so that the printer prints the input image data in the same color as the input image data displayed on the display.

19. A method as claimed in claim 18, further comprising the steps of:

converting, based on the calculated color conversion characteristic, the input image data into print data; and printing the print data in the same color as the input image data displayed on the display means.

20. A method as claimed in claim 18, wherein the test image data is for allowing the display to display a shape corresponding to the display characteristic of the display.

21. A method as claimed in claim 18, wherein the user is allowed to input name of his/her perceived shape displayed on the display.

22. A display characteristic determining device as claimed in claim 1, wherein each of the at least three image sections, constituting the predetermined teat image, has a corresponding shape and is located at a corresponding position, a plurality of combinations of at least one image section, out of the at least three image sections, representing a plurality of different composite images, and wherein the control means controls the display means to display the test image data, thereby allowing the user to visually perceive one of the plurality of different composite images, that corresponds to the display characteristic of the display, the input means allowing the user to input information on his/her perceived composite image.

23. A display characteristic determining device as claimed in claim 22, wherein the test image data further represents a background area to be displayed at at least one predetermined background tone level, wherein the control means controls the display to display the test image data, the display having a display characteristic that determines relationship between displayed brightness of each of the at least three tone levels and displayed brightness of the background tone level, thereby allowing the user to visually perceive at least one image section on the background area, all of the perceived at least one image section composing a single composite image corresponding to the display characteristic of the display, the input means allowing the user to input information on his/her perceived single composite image.

24. A display characteristic determining device as claimed in claim 23, wherein the test image data further represents the background area to be displayed at one predetermined background tone level indicative of a minimum tone level, the control means controlling the display to display the test image data, the display having a black point that determines relationship between displayed brightness of each of the at least three tone levels and displayed brightness of the background minimum tone level, thereby allowing the user to visually perceive at least one image section on the background area, all of the perceived at least one image section composing a single composite image coding to the black point of the display, the input means allowing the user to input information on his/her perceived single composite image, the calculation means calculating the black point of the display based on the inputted information.

25. A display characteristic determining device as claimed in claim 23, wherein the test image data further represents the background area to be displayed by two predetermined background tone levels indicative of a minimum tone level and a maximum tone level, the control means controlling the display to display the test image data, the display having a gamma value that determines relationship between displayed brightness of each of the at least three tone levels and displayed brightness of the background area, thereby allowing the user to visually perceive at least one image section on the background area, all of the perceived at least one image section composing a single composite image corresponding to the gamma value of the display, the input means allowing the user to input information on his/her perceived single composite image, the calculation means calculating the gamma value of the display based on the inputted information.

26. A display characteristic determining device as claimed in claim 22, wherein the plurality of different composite images represent a plurality of different shapes, the control means controlling the display to display the test image data, thereby allowing the user to visually perceive one composite image that corresponds to the display characteristic of the display, the input means allowing the user to input data of a shape represented by his/her perceived composite image.

27. A display characteristic determining device as claimed in claim 26, wherein the plurality of different composite images represent a plurality of different meanings, the control means controlling the display to display the test image data, thereby allowing the user to visually perceive one composite image that corresponds to the display characteristic of the display, the input means allowing the user to input data of a meaning represented by his/her perceived composite image.

28. A display characteristic determining device as claimed in claim 27, wherein the plurality of different composite images represent a plurality of different letters, the control means controlling the display to display the test image data, thereby allowing the user to visually perceive one composite image that corresponds to the display characteristic of the display, the input means allowing the user to input data of a letter represented by his/her perceived composite image.

29. A display characteristic determining device as claimed in claim 27, wherein the plurality of different composite images represent a plurality of different numeral characters, the control means controlling the display to display the test image data, thereby allowing the user to visually perceive one composite image that corresponds to the display characteristic of the display, the input means allowing the user to input data of a numeral character represented by his/her perceived composite image.

30. A display characteristic determining device as claimed in claim 1, further comprising the display having the display characteristic.

31. An image display and print device as claimed in claim 14, wherein the plurality of different composite images represent a plurality of different shapes, the control means controlling the display means to display the test image data, thereby allowing the user to visually perceive one composite image that corresponds to the display characteristic of the display means, the input means allowing the user to input data of a shape represented by his/her perceived composite image.

32. A method as claimed in claim 18, wherein the plurality of different composite images represent a plurality of different shapes, the display being controlled to display the test image data, thereby allowing the user to visually perceive one composite image that corresponds to the display characteristic of the display, the user being allowed to input data of a shape represented by his/her perceived composite image.

* * * * *